US011982398B2

(12) United States Patent
Wang et al.

(10) Patent No.: US 11,982,398 B2
(45) Date of Patent: May 14, 2024

(54) SUPPORT FRAME AND PHOTOGRAPHING DEVICE

(71) Applicant: PGYTECH CO., LTD., Suzhou (CN)

(72) Inventors: Jun Wang, Suzhou (CN); Guangshan Wang, Suzhou (CN); Xiuzhi Yu, Suzhou (CN)

(73) Assignee: PGYTECH CO., LTD., Suzhou (CN)

( * ) Notice: Subject to any disclaimer, the term of this patent is extended or adjusted under 35 U.S.C. 154(b) by 526 days.

(21) Appl. No.: 16/973,202

(22) PCT Filed: Oct. 12, 2020

(86) PCT No.: PCT/CN2020/120413
§ 371 (c)(1),
(2) Date: Dec. 8, 2020

(87) PCT Pub. No.: WO2022/047882
PCT Pub. Date: Mar. 10, 2022

(65) Prior Publication Data
US 2022/0235898 A1    Jul. 28, 2022

(30) Foreign Application Priority Data

Sep. 3, 2020 (CN) .......................... 202010916504.3

(51) Int. Cl.
*G03B 17/56* (2021.01)
*F16M 11/12* (2006.01)
*F16M 11/24* (2006.01)

(52) U.S. Cl.
CPC ......... *F16M 11/121* (2013.01); *F16M 11/242* (2013.01); *G03B 17/561* (2013.01)

(58) Field of Classification Search
CPC .... G03B 17/56; G03B 17/561; G03B 17/563; G03B 17/566; F16M 11/02; F16M 11/04;
(Continued)

(56) References Cited

U.S. PATENT DOCUMENTS

| 8,770,539 | B1 | 7/2014 | Hsu | |
| 2009/0190917 | A1* | 7/2009 | Chai | ..................... G03B 17/00 396/428 |

(Continued)

FOREIGN PATENT DOCUMENTS

| CN | 101691902 A | 4/2010 |
| CN | 204647768 U | 9/2015 |

(Continued)

OTHER PUBLICATIONS

Notification to Grant Patent for Invention. The State Intellectual Property Office of People's Republic of China. International Publication No. 202010916504.3.

(Continued)

*Primary Examiner* — Clayton E. LaBalle
*Assistant Examiner* — Fang-Chi Chang
(74) *Attorney, Agent, or Firm* — David G. Rosenbaum; Rosenbaum IP, P.C.

(57) ABSTRACT

The present disclosure relates to a support frame including a first pan-tilt connector and a leg assembly connected thereto and including a primary leg and a secondary leg. A leg adjustment structure is provided between and configured to unlock or lock the primary leg and the secondary leg, so that the primary leg and the secondary leg can move relative to each other or keep relatively stationary; the secondary leg comprises a first sub-leg and a second sub-leg which are configured such that the first sub-leg and the second sub-leg can be unfolded or folded with respect to each other; when the first sub-leg and the second sub-leg are unfolded, the primary leg, the first sub-leg and the second sub-leg are in a three-leg support state. The present disclosure further provides a photographing device, which comprises the support frame and an image acquisition apparatus mounted on the support frame.

16 Claims, 15 Drawing Sheets

(58) Field of Classification Search
CPC ...... F16M 11/041; F16M 11/06; F16M 11/16; F16M 11/20; F16M 11/2007; F16M 11/22; F16M 11/24; F16M 11/242; F16M 11/245; F16M 11/247; F16M 11/34; F16M 11/36; F16M 11/38; F16M 13/02; F16M 13/022; F16M 13/04; F16M 2200/02; F16M 2200/021; F16M 2200/022; F16M 2200/08
See application file for complete search history.

(56) References Cited

U.S. PATENT DOCUMENTS

| | | | |
|---|---|---|---|
| 2019/0071027 | A1 | 4/2019 | Yang |
| 2021/0294186 | A1* | 9/2021 | Zou ...................... F16M 11/242 |

FOREIGN PATENT DOCUMENTS

| | | | | | |
|---|---|---|---|---|---|
| CN | 205336408 | U | | 6/2016 | |
| CN | 205534967 | U | * | 8/2016 | |
| CN | 205534967 | U | | 8/2016 | |
| CN | 206386657 | U | | 8/2017 | |
| CN | 208185809 | U | * | 12/2018 | |
| CN | 112032536 | A | | 10/2020 | |
| CN | 110799788 | A | | 5/2021 | |
| CN | 202421700 | U | | 11/2021 | |
| DE | 202008008834 | U1 | | 11/2008 | |
| DE | 202014010075 | U1 | | 3/2015 | |
| DE | 202014010075 | U1 | * | 4/2015 | ............ F16M 11/10 |
| KR | 100979671 | B1 | * | 9/2010 | |
| WO | WO-2020037819 | A1 | * | 2/2020 | |

OTHER PUBLICATIONS

International Preliminary Report of Patentability. Chapter 1 of the Patent Cooperation Treaty. International Application No. PCT/CN2020/120413 dated May 26, 2021.
First Office Action, The State Intellectual Property Office of People's Republic of China. International Publication No. 202010916504.3.
Second Office Action; The State Intellectual Property Office of People's Republic of China. International Publication No. 202010916504.3.
Written Opinion of the International Searching Authority; International Application No. PCT/CN2020/120413 dated May 26, 2021.
International Search Report of the International Searching Authority. International Application No. PCT/CN2020/120413 dated May 26, 2021.

* cited by examiner

SUPPORT FRAME AND PHOTOGRAPHING DEVICE

CROSS-REFERENCE TO RELATED APPLICATION

The present disclosure claims the priority to the Chinese patent application with the filing number 202010916504.3, filed on Sep. 3, 2020 with the Chinese Patent Office, and entitled "Support Frame and Photographing Device", the contents of which are incorporated herein by reference in entirety.

TECHNICAL FIELD

The present disclosure relates to the technical field of photographic and camera shooting equipment, in particular to a support frame and a photographing device.

BACKGROUND ART

With the development of society, the number of people who love photographing is growing day by day, and the functions of the photographic equipment are also constantly improved. Currently, when photographing, if holding a handheld apparatus used in the relevant art such as photographing or camera shooting for a long time, the user will feel uncomfortable with hand or arm.

SUMMARY

The present disclosure provides a support frame, which includes a first pan-tilt connector and a leg assembly connected to the first pan-tilt connector;
  the leg assembly includes a primary leg and a secondary leg; a leg adjustment structure is provided between the primary leg and the secondary leg, the leg adjustment structure is configured to unlock or lock the primary leg and the secondary leg, so that the primary leg and the secondary leg can move relatively or keep relatively stationary;
  the secondary leg includes a first sub-leg and a second sub-leg, and the first sub-leg and the second sub-leg are configured in such a manner that the first sub-leg and the second sub-leg can be unfolded or folded with respect to each other, wherein when the first sub-leg and the second sub-leg are unfolded with respect to each other, the primary leg, the first sub-leg and the second sub-leg are in a three-leg support state.

Optionally, one end of the primary leg, one end of the first sub-leg and one end of the second sub-leg are connected to each other so as to form an end connection portion; and
  the first pan-tilt connector is provided at the end connection portion.

Optionally, the support frame further includes a second pan-tilt connector, wherein the second pan-tilt connector is provided on the primary leg.

Optionally, the support frame further includes a stop member, wherein at least the primary leg is provided with the stop member configured to enable the support frame to be mounted on a host object.

Optionally, an angle adjustment structure is provided between the first sub-leg and the second sub-leg, and configured to adjust an opening angle between the first sub-leg and the second sub-leg.

Optionally, the angle adjustment structure includes a damping shaft configured to pass through a damping hole of the first sub-leg and a damping hole of the second sub-leg, wherein each of inner walls of the damping hole of the first sub-leg and the damping hole of the second sub-leg is provided with a first limiting rib extending along the axial direction of the each inner wall, and the first limiting rib is configured to be limited in the first limiting groove which is located at outer circumferential surface of the damping shaft and extends along an axis of the damping shaft.

Optionally, the support frame further includes a pan-tilt adjustment structure, configured to adjust a rotation angle of the first pan-tilt connector relative to the primary leg.

Optionally, the pan-tilt adjustment structure includes a first button, a first crankset, a second crankset and a first elastic member, wherein the first crankset is fixedly connected to the first pan-tilt connector, and the first elastic member is configured to enable teeth on the second crankset to mesh with teeth on the first crankset; the first button is configured to overcome an elastic force of the first elastic member under action of an external force, so that the teeth on the second crankset are separated from the teeth on the first crankset.

Optionally, the leg adjustment structure includes a first adapter (i.e. first switching element or transition element); the first adapter includes a first cylindrical ring; an outer circumferential surface of the first cylindrical ring has a plurality of positioning grooves distributed along a circumferential direction of the first cylindrical ring, the primary leg has a second button, and the second button is configured to be able to be limited in different positioning grooves, so as to adjust the opening angle between the primary leg and the secondary leg.

Optionally, the primary leg is fixedly connected to a second adapter (i.e. second switching element or transition element), the second adapter is connected to the first adapter, and the second adapter can rotate relative to the first adapter; the first crankset and the second crankset are both located between the second adapter and the first adapter, and wherein the second crankset is located between the first crankset and the second adapter.

Optionally, one surface of the second crankset having no teeth has a guide post, and one surface of the second adapter has a guide groove cooperating with the guide post.

Optionally, the second adapter has a shaft hole, and the guide groove is provided on a hole wall of the shaft hole.

Optionally, one end of the first elastic member abuts against a hole bottom of the shaft hole, and the other end of the first elastic member abuts against one surface of the second crankset having the guide post.

Optionally, the pan-tilt adjustment structure further includes a first nylon gasket, a second nylon gasket, a retaining screw, a screw sleeve, a locking screw and a shaft sleeve, wherein the first nylon gasket is located between the first adapter and the first crankset, the second nylon gasket is sandwiched between the first crankset and the second adapter, a stop cap of the shaft sleeve is in contact with one side of the second adapter, the locking screw is threadedly connected to an internal thread of the screw sleeve after passing through a sleeve hole of the shaft sleeve, and the retaining screw is threadedly connected to the threaded hole at the end of the locking screw.

Optionally, the angle adjustment structure further includes a third nylon gasket, a fourth nylon gasket, a bottom cover and a flat-head screw, wherein the third nylon gasket is located between a disc-like structure of the first sub-leg and a bottom rest, the fourth nylon gasket is located between a disc-like structure of the second sub-leg and the disc-like structure of the first sub-leg, the bottom cover is fixedly connected to the insertion shaft of the first adapter via the flat-head screw, the bottom cover has a concave hole, and the concave hole has an inner spline cooperating with an outer spline on an outer surface of the insertion shaft.

Optionally, the first pan-tilt connector is fixedly connected to an outer circumferential surface of the first crankset.

Optionally, the first pan-tilt connector is provided with a first insertion slot, an insertion opening of the first insertion slot is provided with a first stopper, and the first stopper is configured to be able to extend or retract under the elastic action of the second elastic member.

Optionally, the second pan-tilt connector is provided with a second insertion slot, an insertion opening of the second insertion slot is provided with a second stopper, and the second stopper is configured to be able to extend or retract under the elastic action of the third elastic member.

Optionally, the stop member is provided at the other opposite end of the primary leg (i.e., one end of the primary leg that is not connected to one end of the first sub-leg and one end of the second sub-leg), and the stop member is configured to be rotatable relative to the primary leg for cooperating with the primary leg to form a hook structure.

The present disclosure further provides a photographing device, which includes an image acquisition apparatus and the support frame; and the image acquisition apparatus is mounted on the support frame.

BRIEF DESCRIPTION OF DRAWINGS

In order to more clearly illustrate the technical solutions in specific embodiments of the present disclosure or in the prior art, drawings which need to be used in the description of the specific embodiments or the prior art will be introduced briefly below, and apparently, the drawings in the description below merely show some embodiments of the present disclosure, and a person ordinarily skilled in the art still could obtain other drawings in light of these drawings without using creative efforts.

REFERENCE SIGNS

Figure 1:
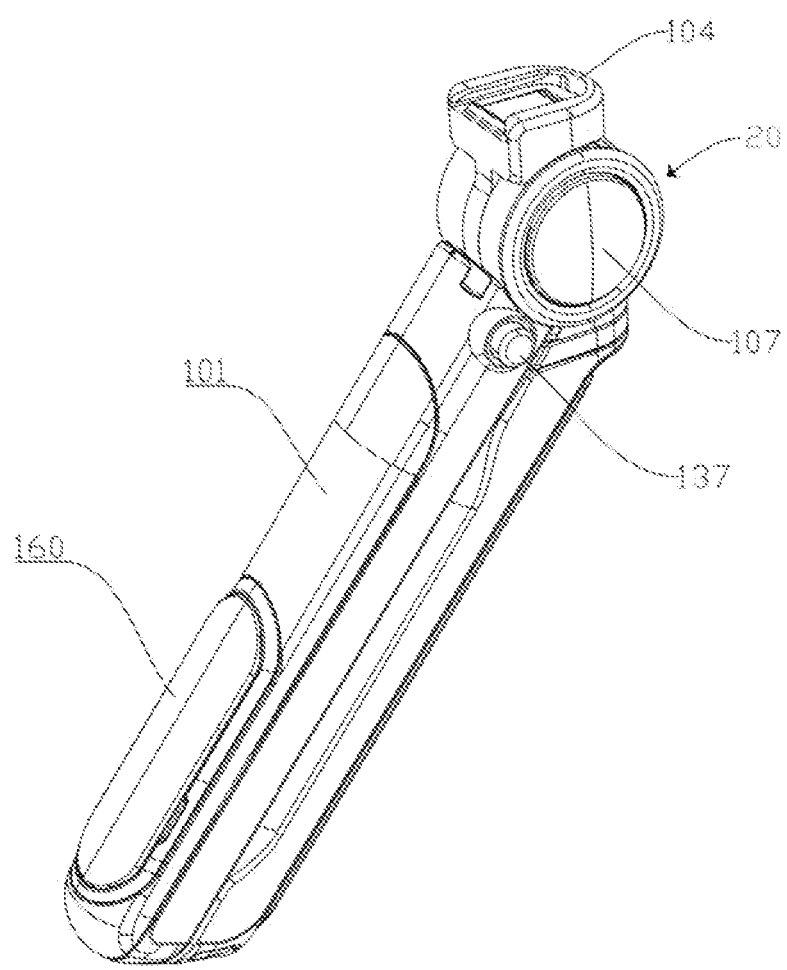
FIG. 1 is an axonometric view of a support frame provided in embodiments of the present disclosure.
Figure 2:
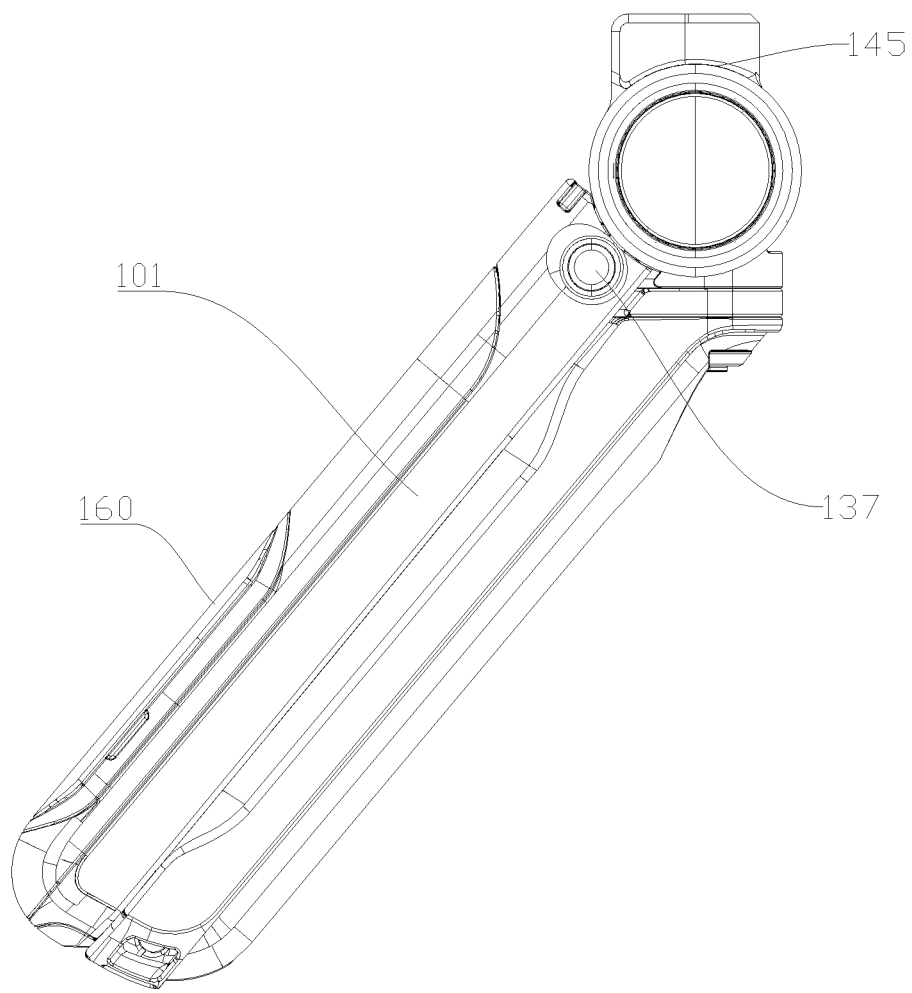
FIG. 2 is a front view of the support frame provided in embodiments of the present disclosure.
Figure 3:
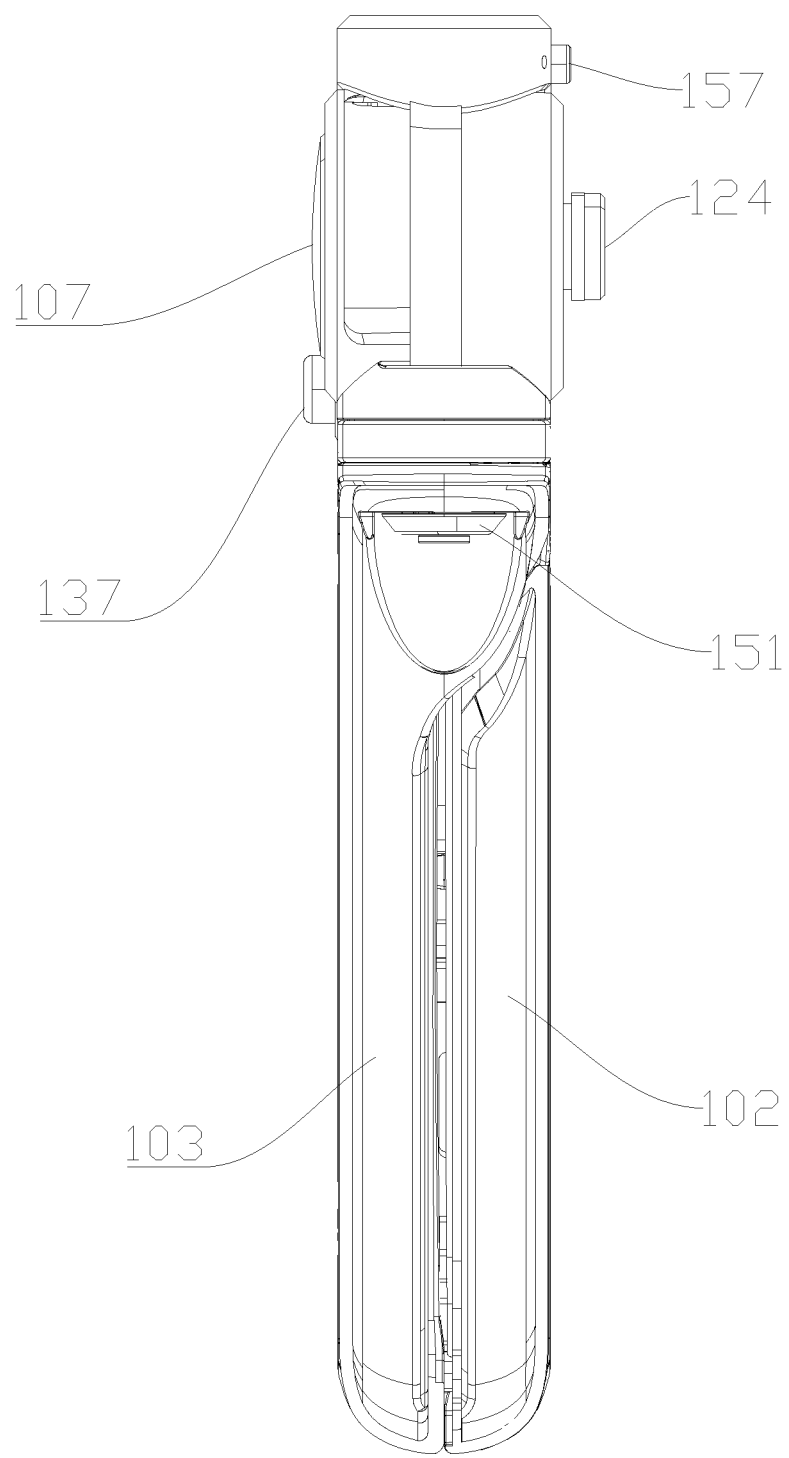
FIG. 3 is a right view of the support frame provided in embodiments of the present disclosure.
Figure 4:
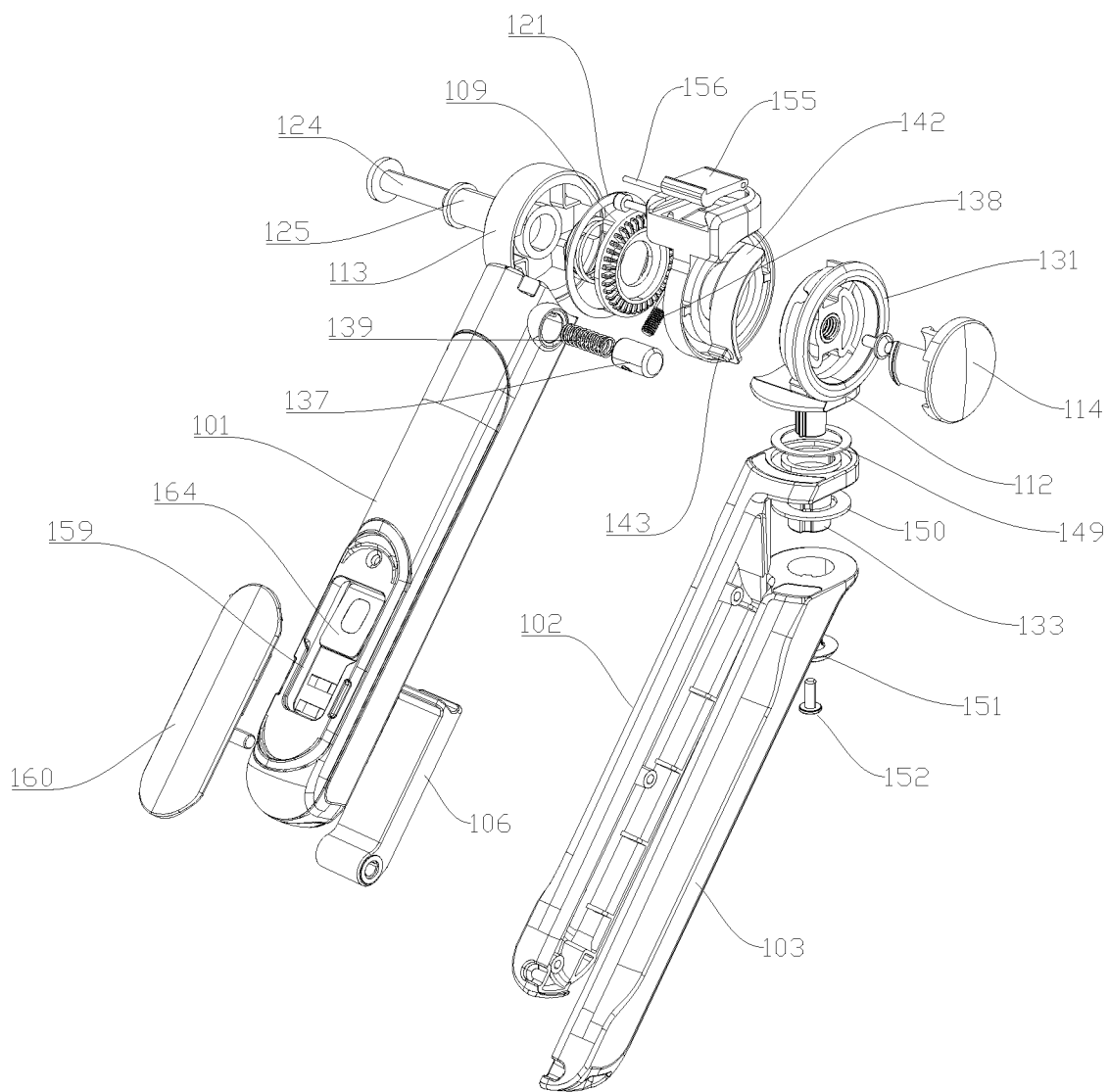
FIG. 4 is an exploded view of the support frame provided in embodiments of the present disclosure.
Figure 5:
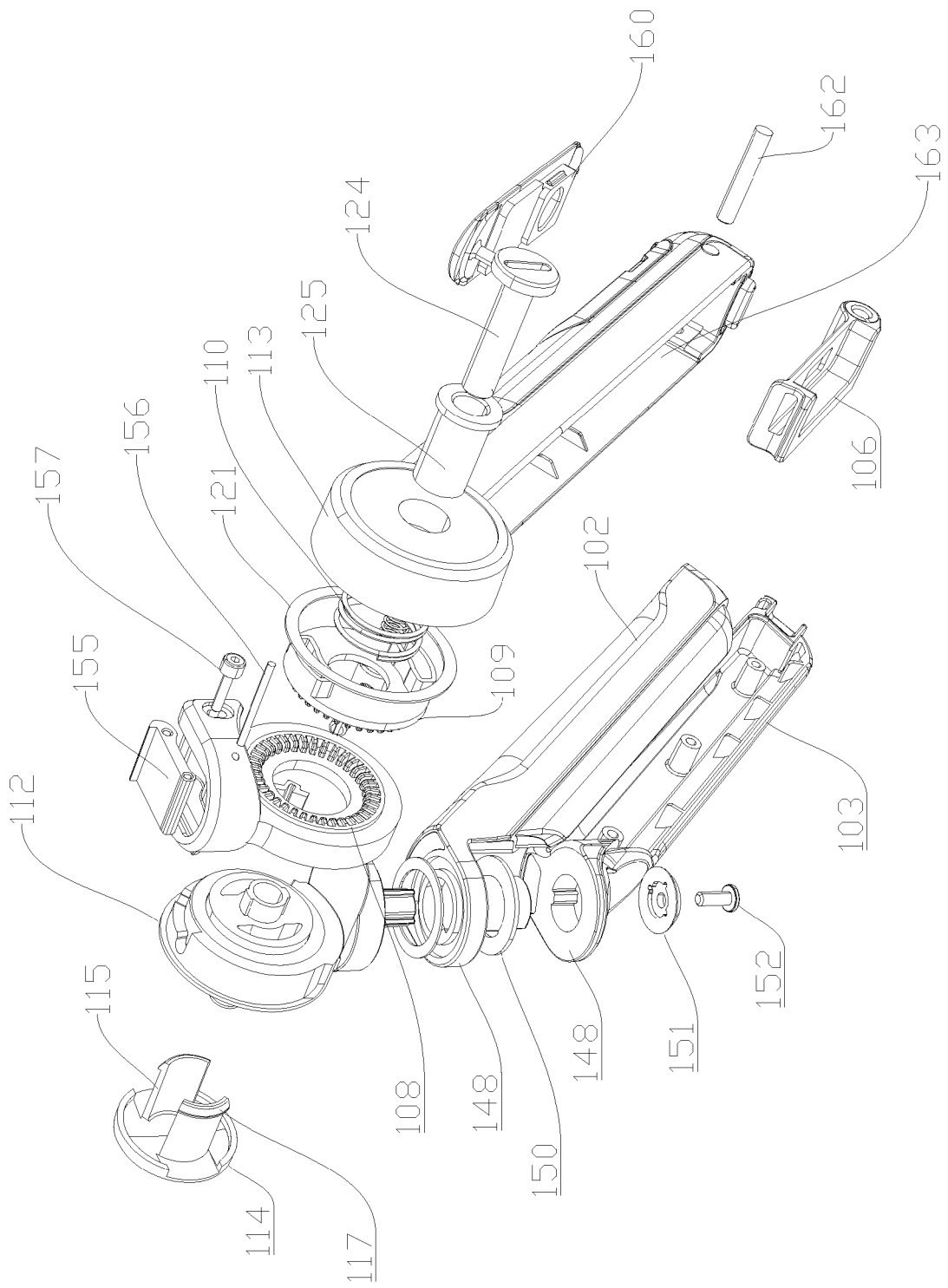
FIG. 5 is an exploded view of the support frame provided in embodiments of the present disclosure, from another perspective.
Figure 6:
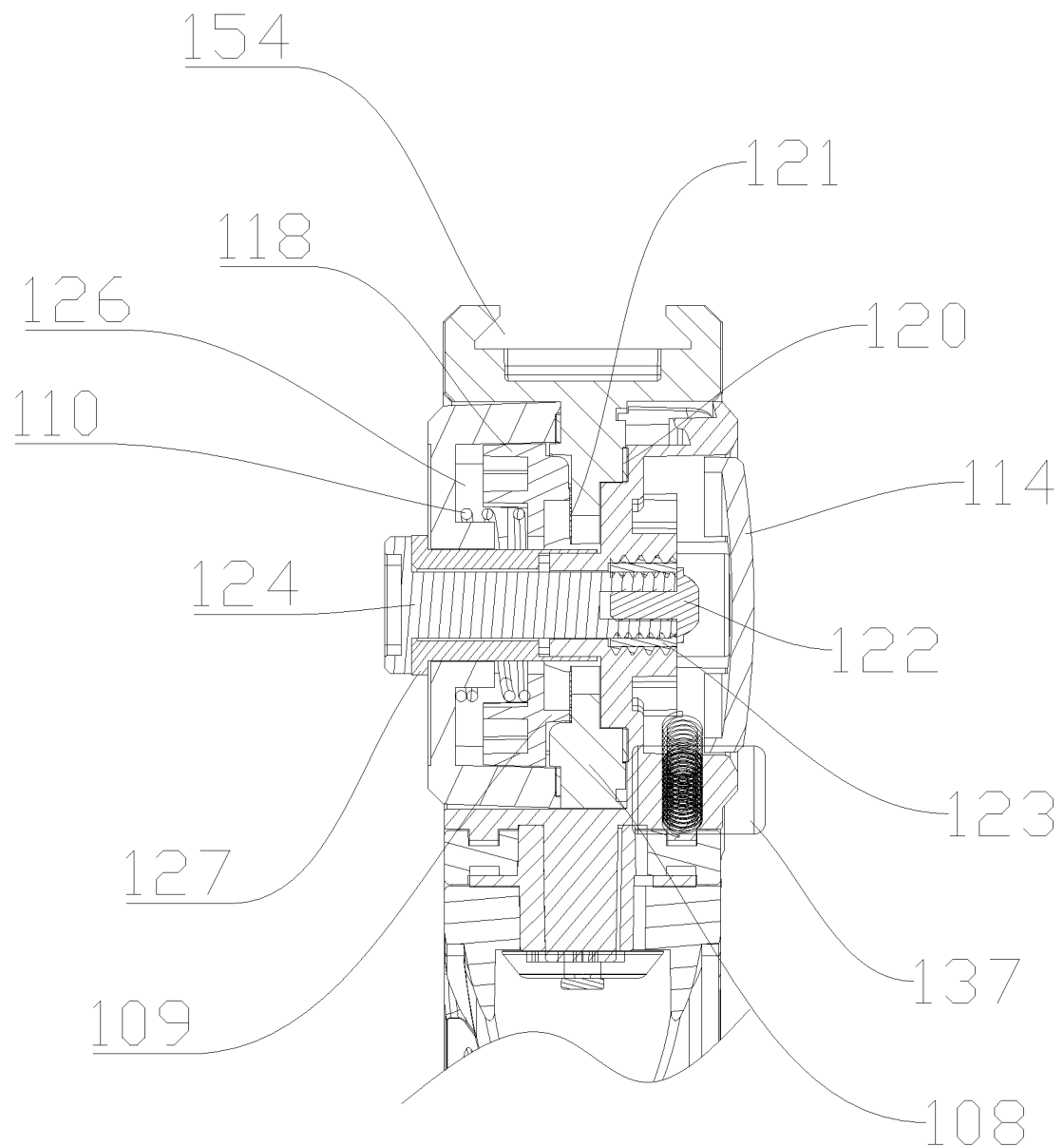
FIG. 6 is a sectional view of a partial structure of the support frame provided in embodiments of the present disclosure.
Figure 7:
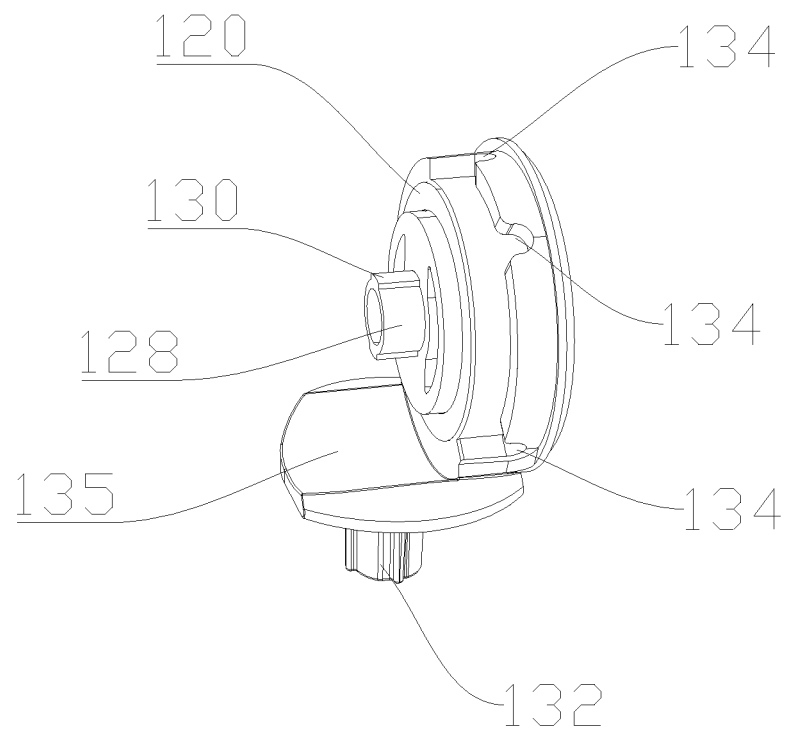
FIG. 7 is a structural schematic view of a first adapter in embodiments of the present disclosure.
Figure 8:
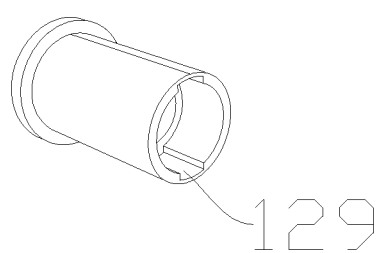
FIG. 8 is a structural schematic view of a shaft sleeve in embodiments of the present disclosure.
Figure 9:
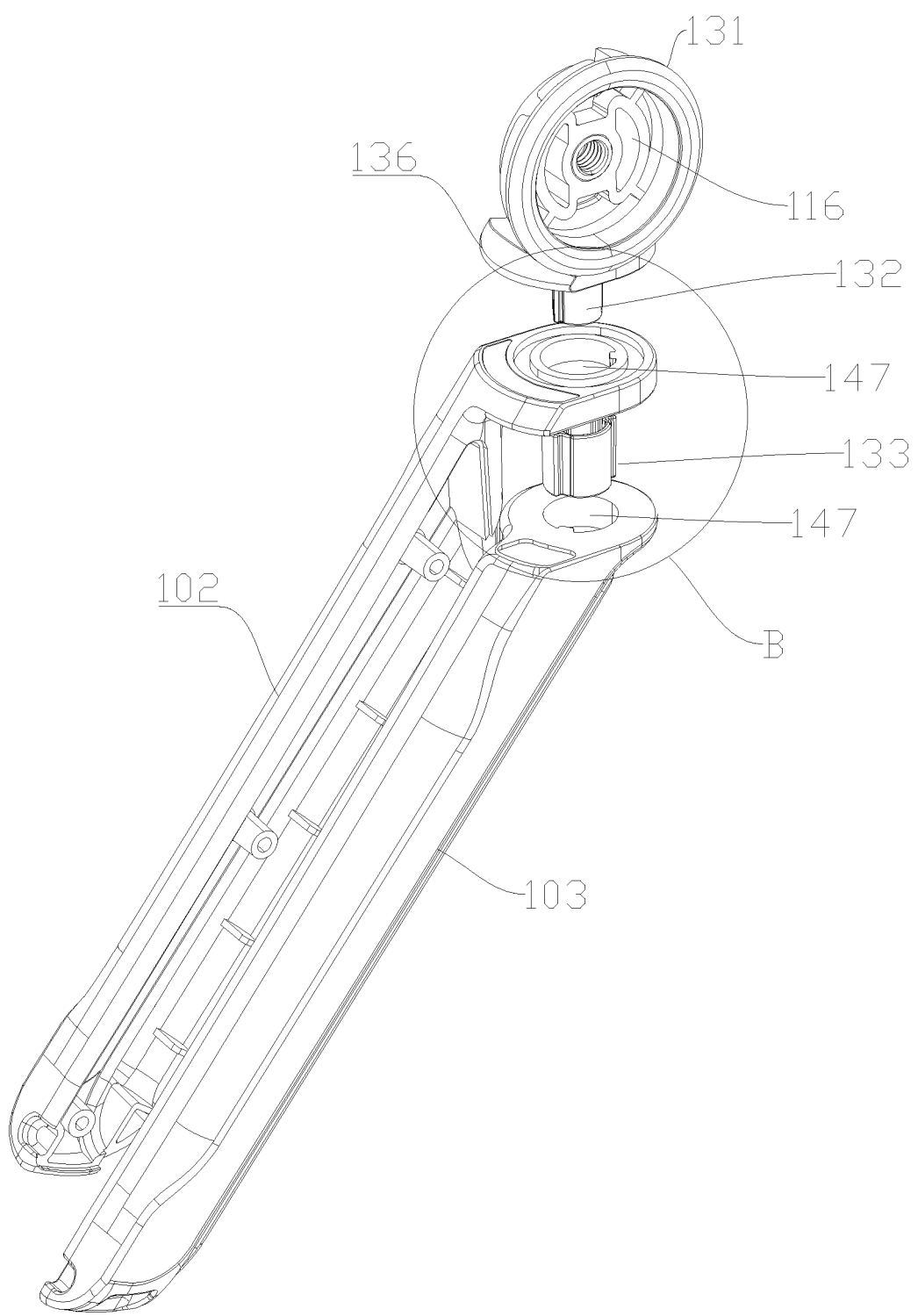
FIG. 9 is an exploded view showing the first adapter, a damping shaft, a first sub-leg and a second sub-leg in embodiments of the present disclosure.
Figure 10:
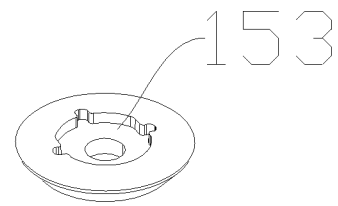
FIG. 10 is a structural schematic view of a bottom cover in embodiments of the present disclosure.
Figure 11:
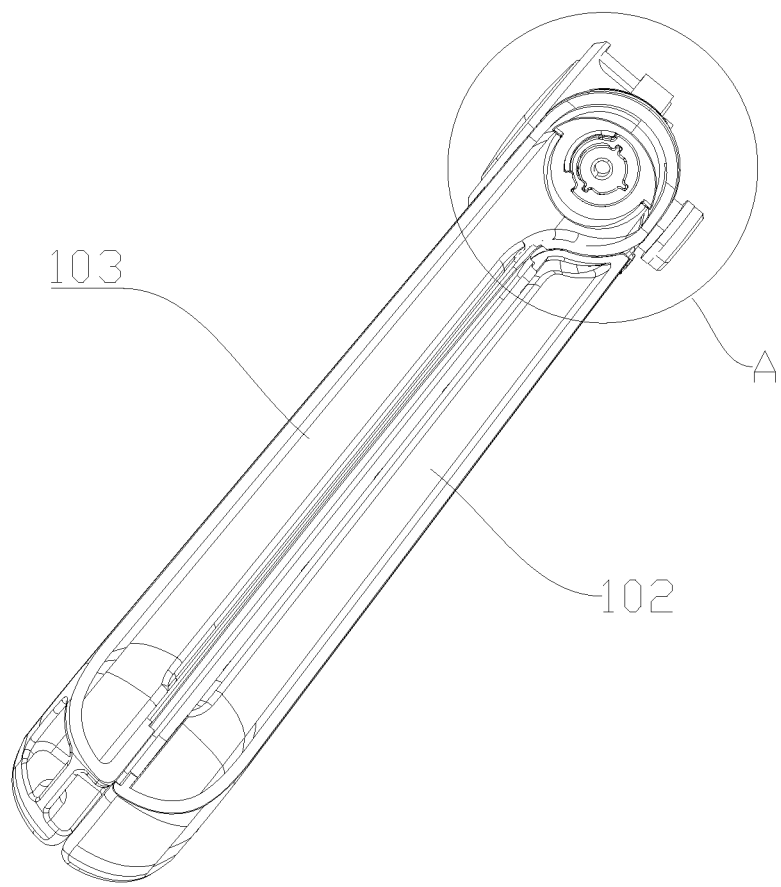
FIG. 11 is a structural schematic view of assembly relationship among the first adapter, the damping shaft, the first sub-leg and the second sub-leg, viewed from the bottom to the top, in embodiments of the present disclosure (a flat-head screw and the bottom cover are removed)
Figure 12:
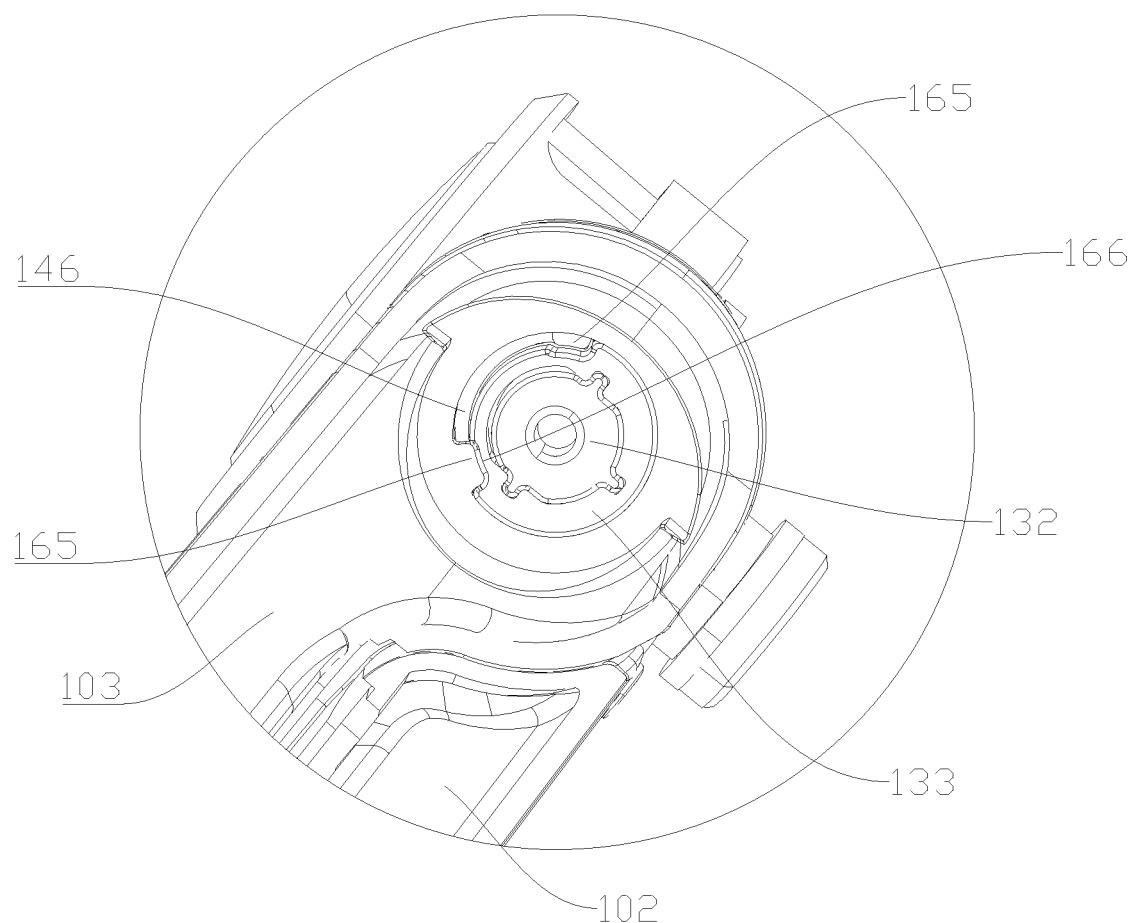
FIG. 12 is a local enlarged view of part A in FIG. 11.
Figure 13:
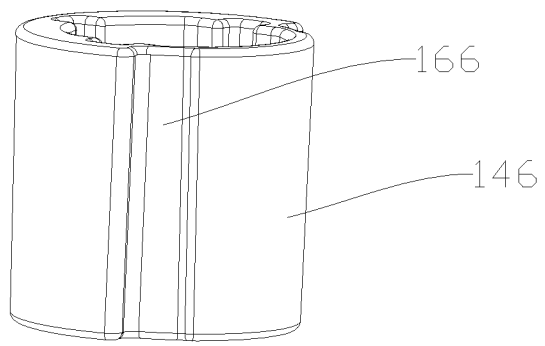
FIG. 13 is a structural schematic view of the damping shaft in embodiments of the present disclosure.
Figure 14:
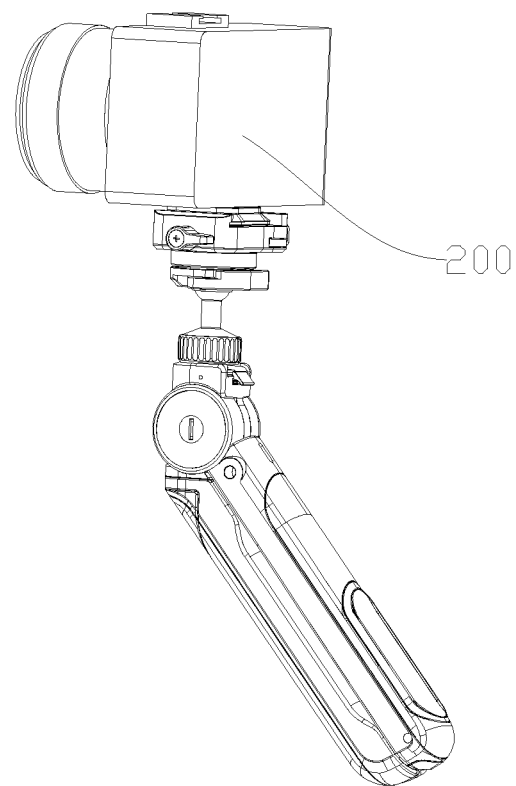
FIG. 14 is a structural schematic view showing that an image acquisition device is mounted on the support frame through a pan-tilt in embodiments of the present disclosure (handheld mode)
Figure 15:
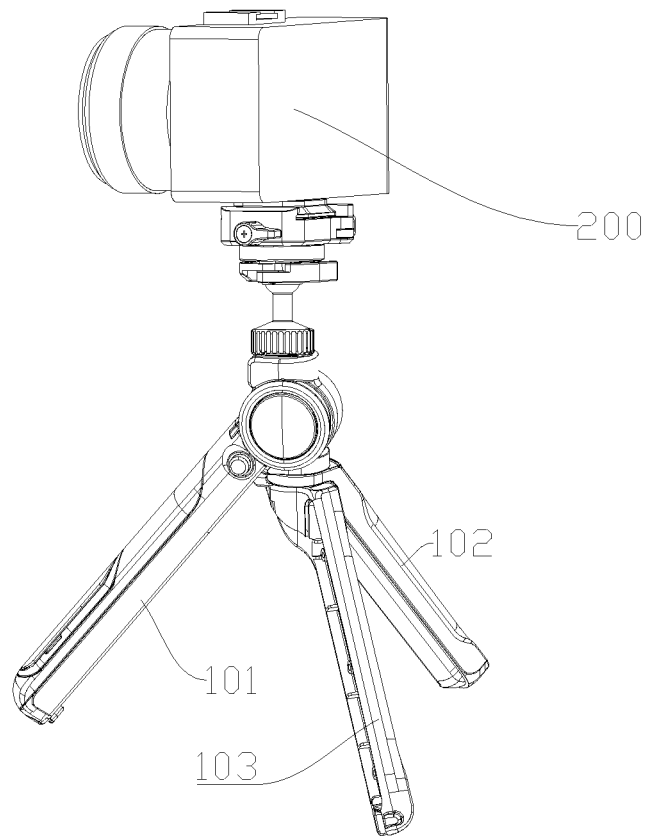
FIG. 15 is a structural schematic view showing that the image acquisition device is mounted on the support frame in embodiments of the present disclosure (high-position three-leg support mode)
Figure 16:
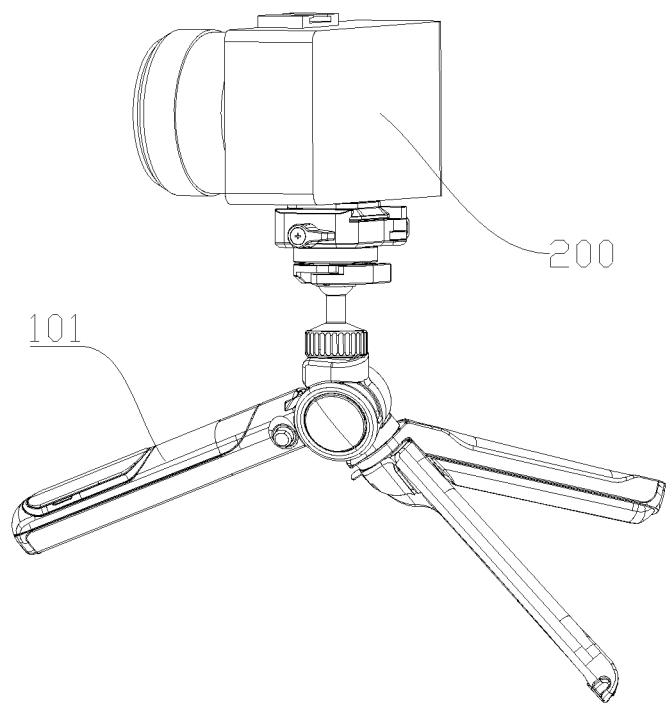
FIG. 16 is a structural schematic view showing that the image acquisition device is mounted on the support frame in embodiments of the present disclosure (low-position three-leg support mode)
Figure 17:
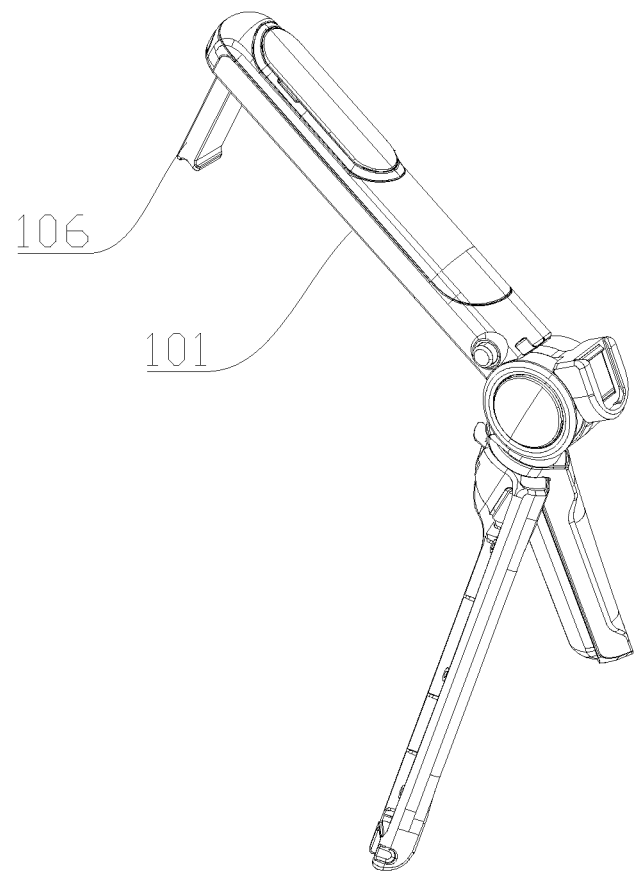
FIG. 17 is a structural schematic view showing that the support frame is in a mount state in embodiments of the present disclosure.

10—leg assembly; 20—leg adjustment structure; 40—angle adjustment structure; 101—primary leg; 201—secondary leg; 102—first sub-leg; 103—second sub-leg; 104—first pan-tilt connector; 105—second pan-tilt connector; 106—stopper; 107—first button; 108—first crankset; 109—second crankset; 110—first elastic member; 210—second elastic member; 310—third elastic member; 112—first adapter; 113—second adapter; 114—keycap; 115—key handle; 116—insertion hole; 117—first protrusion; 118—guide post; 119—guide groove; 120—first nylon gasket; 121—second nylon gasket; 122—retaining screw; 123—screw sleeve; 124—locking screw; 125—shaft sleeve; 126—shaft hole; 127—stop cap; 128—positioning shaft; 129—rotation stop groove; 130—rotation stop protrusion; 131—first cylindrical ring; 132—insertion shaft; 133—damping shaft; 134—positioning groove; 135—arc-shaped curved surface; 136—bottom rest; 137—first columnar portion; 138—second columnar portion; 139—return elastic member; 140—key hole; 141—side hole; 142—shield; 143—protrusion; 144—recess; 145—arc-shaped surface; 146—first limiting groove; 147—damping hole; 148—disc-like structure; 149—third nylon gasket; 150—fourth nylon gasket; 151—bottom cover; 152—flat-head screw; 153—concave hole; 154—first insertion slot; 155—first stopper; 156—first pin shaft; 157—second pin shaft; 159—second insertion slot; 160—leg cover; 162—fifth pin shaft; 163— countersink; 164—second stopper; 165—first limiting rib; 166—positioning notch; 200—image acquisition apparatus; 300—host object.

DETAILED DESCRIPTION OF EMBODIMENTS

Technical solutions of the present disclosure will be described clearly and completely below in combination with accompanying drawings, and apparently, the embodiments described are only a part of embodiments of the present disclosure, rather than all embodiments.

Generally, components in the embodiments of the present disclosure described and shown in the accompanying drawings herein may be arranged and designed in different configurations. Therefore, the detailed description below of the embodiments of the present disclosure provided in the accompanying drawings is not intended to limit the scope of protection of the present disclosure, but merely represents chosen embodiments of the present disclosure.

Based on the embodiments in the present disclosure, all of other embodiments obtained by a person ordinarily skilled in the art, without using creative efforts, shall fall within the scope of protection of the present disclosure.

In the description of the present disclosure, it should be indicated that orientational or positional relationships indicated by terms "center", "upper", "lower", "left", "right", "vertical", "horizontal", "inner", "outer" and so on are based on orientational or positional relationships as shown in the accompanying drawings, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying importance in the relativity.

In the description of the present disclosure, it should be noted that unless otherwise specified and defined clearly, terms "mount", "join", and "connect" should be understood in a broad sense, for example, a connection may be a fixed connection, a detachable connection, or an integrated connection; it may be a mechanical connection or an electrical connection; it may be a direct connection or an indirect connection through an intermediary, and it also may be an inner communication between two elements. For a person ordinarily skilled in the art, specific meanings of the above-mentioned terms in the present disclosure could be understood according to specific circumstances.

The present disclosure provides a support frame and a photographing device, so as to solve the technical problem in the prior art that the user may feel uncomfortable with hand or arm if holding the device with hand for a long time.

The beneficial effects of the present disclosure mainly lie in the follows.

For the support frame provided in the present disclosure, unlocking and locking between a primary leg and a secondary leg may be conveniently realized through a leg adjustment structure; moreover, the secondary leg includes a first sub-leg and a second sub-leg which can be unfolded or folded, thus three-leg support may be realized just through the three legs, so that after long-term handholding, the first sub-leg and the second sub-leg may be unfolded, then the two hands may be freed through the three-leg support, and the use functions of the support frame is diversified.

The present disclosure further provides a photographing device, which includes an image acquisition device and the support frame; and the image acquisition device is mounted on the support frame. Based on the above analysis, it can be seen that the photographing device may have multiple use states, and it may be handheld or may be supported by three legs so as to free the two hands.

Referring to FIG. 1 to FIG. 21, an embodiment of the present disclosure provides a support frame, which includes a first pan-tilt connector 104 and a leg assembly 10 connected to the first pan-tilt connector 104; the leg assembly 10 includes a primary leg 101 and a secondary leg 201; a leg adjustment structure 20 is provided between the primary leg 101 and the secondary leg 201, for unlocking or locking the primary leg 101 and the secondary leg 201, so that the primary leg 101 and the secondary leg 201 may move with respect to each other or keep relatively stationary; the secondary leg 201 may include a first sub-leg 102 and a second sub-leg 103, and the first sub-leg 102 and the second sub-leg 103 may be unfolded or folded with respect to each other; when the first sub-leg 102 and the second sub-leg 103 are unfolded with respect to each other, the primary leg 101, the first sub-leg 102 and the second sub-leg 103 are in a three-leg support state.

The relative movement between the primary leg 101 and the secondary leg 201 may refer to an action such as rotation or turning of the primary leg 101 relative to the secondary leg 201, so that an angle formed between a length direction of the primary leg 101 and a length direction of the secondary leg 201 may be adjusted, that is, an opening angle between the primary leg 101 and the secondary leg 201 may be adjusted; however, the leg adjustment structure 20 has the unlocking and locking functions, that is, after unlocking, the opening angle between the primary leg 101 and the secondary leg 201 may be adjusted according to needs, and after a required angle is obtained, the required angle between the primary leg 101 and the secondary leg 201 is kept through the locking function, that is, the required angle is kept unchanged. The primary leg 101 may be folded with the secondary leg 201, which facilitates the storage of the support frame and reduces the space occupied by the support frame.

The first sub-leg 102 and the second sub-leg 103 may be unfolded or folded through an action such as relative rotation or turning. When the first sub-leg 102 and the second sub-leg 103 are folded, the storage of the support frame is facilitated and the space occupied by the support frame is reduced. When the opening angle has been adjusted between the primary leg 102 and the secondary leg 103, the primary leg 101, the first sub-leg 102 and the second sub-leg 103 are in a common three-leg support state by unfolding the first sub-leg 102 and the second sub-leg 103, achieving support for the image acquisition apparatus 200.

When the image acquisition apparatus 200 itself is provided with an interface structure cooperating with the first pan-tilt connector 104 in this embodiment, the image acquisition apparatus 200 may be directly mounted on the first pan-tilt connector 104; when having no interface structure cooperating with the first pan-tilt connector 104, the image acquisition apparatus 200 may be mounted on the first pan-tilt connector 104 in an indirect manner, that is, an indirect mounting structure is adopted, for example, the image acquisition apparatus 200 is mounted on the first pan-tilt connector 104 by a mounting structure that can be adopted, such as, a quick release plate, a pan-tilt or a mounting clip.

It should be noted that, the number of sub-legs of the secondary leg may be not limited to two, that is, including the first sub-leg 102 and the second sub-leg 103, and the number of sub-legs of the secondary leg also may be three, four, five or more.

For the support frame provided in an embodiment of the present disclosure, unlocking and locking between the primary leg 101 and the secondary leg 201 may be conveniently realized through the leg adjustment structure 20; moreover, the secondary leg 201 includes the first sub-leg 102 and the second sub-leg 103, and can be unfolded or folded, thus three-leg support may be realized just through the three legs, so that after long-term handholding, the first sub-leg 102 and the second sub-leg 103 may be unfolded, then the two hands may be freed through the three-leg support, and the use functions of the support frame is diversified.

Figure 19:
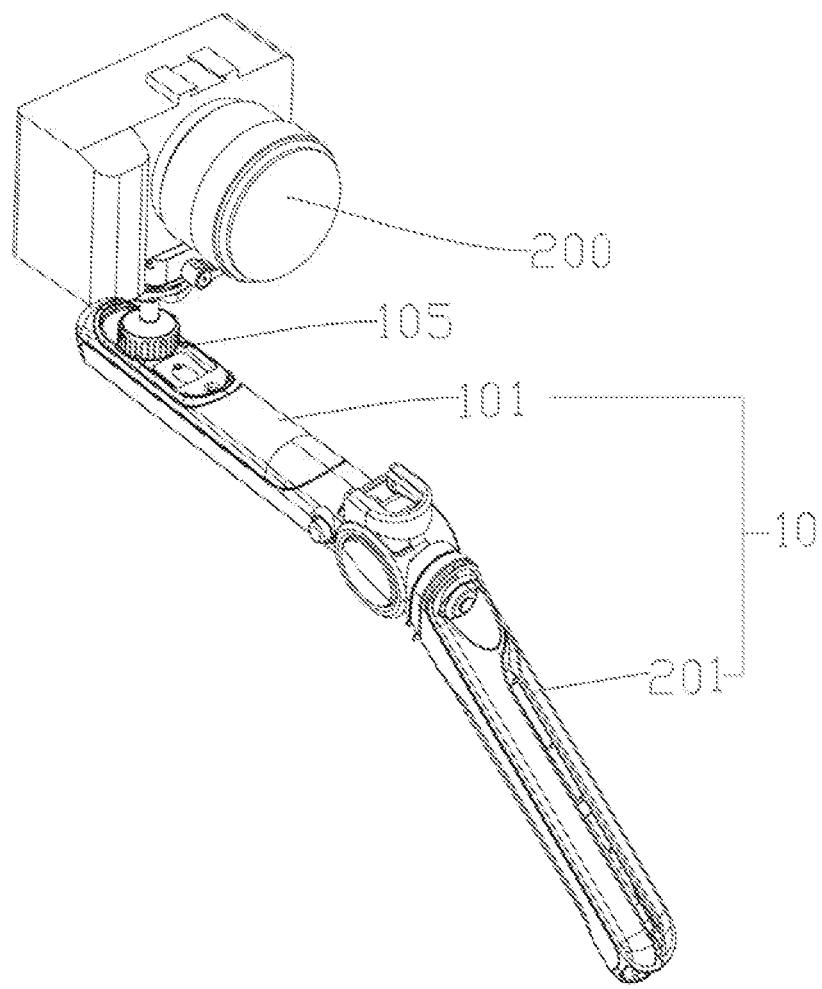
FIG. 19 is a structural schematic view showing that the image acquisition device is mounted on the support frame in embodiments of the present disclosure (extended handheld mode)
Figure 20:
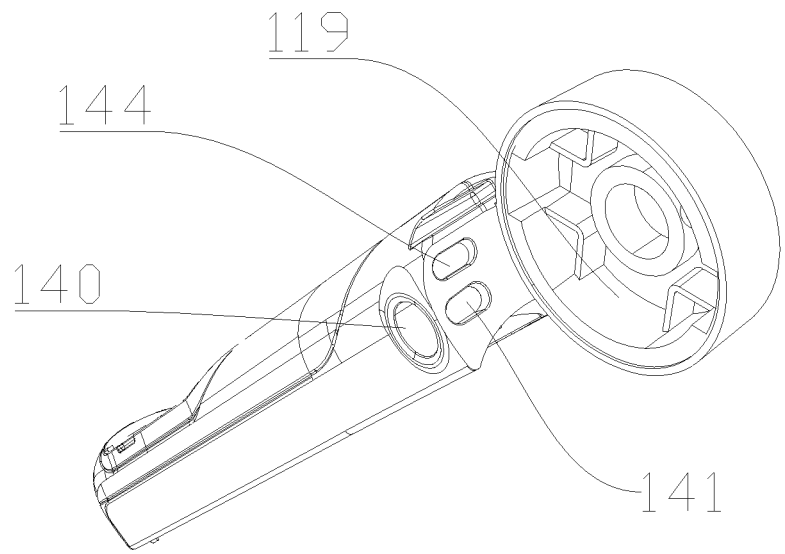
FIG. 20 is a structural schematic view of connecting a primary leg and a second adapter in embodiments of the present disclosure.
Figure 21:
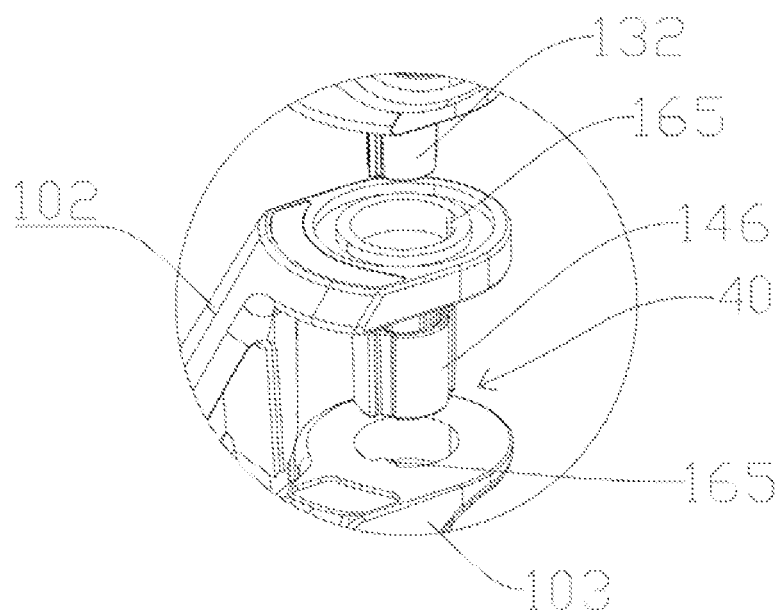
FIG. 21 is a local enlarged schematic view of part B in FIG. 9.

In an optional solution of this embodiment, one end of the primary leg 101, one end of the first sub-leg 102 and one end of the second sub-leg 103 are connected to each other so as to form an end connection portion; and the first pan-tilt connector 104 is provided at the end connection portion. The end connection portion may refer to a spatial position of the first pan-tilt connector 104 on the support frame. As shown in FIG. 19, the support frame may further include a second pan-tilt connector 105, wherein the second pan-tilt connector 105 is provided on the primary leg 101, and the second pan-tilt connector 105 may be provided in the middle of the primary leg 101, at the other end of the primary leg 101 or at a position close to the other end of the primary leg 101, then the image acquisition apparatus 200 may be mounted at different positions on the support frame through the second pan-tilt connector 105, so as to meet different use requirements.

It should be noted that, optionally, the first pan-tilt connector 104 further may be provided on the primary leg 101, and the second pan-tilt connector 105 is provided on the end connection portion formed after one end of the primary leg 101, one end of the first sub-leg 102 and one end of the second sub-leg 103 are connected to each other.

Figure 18:
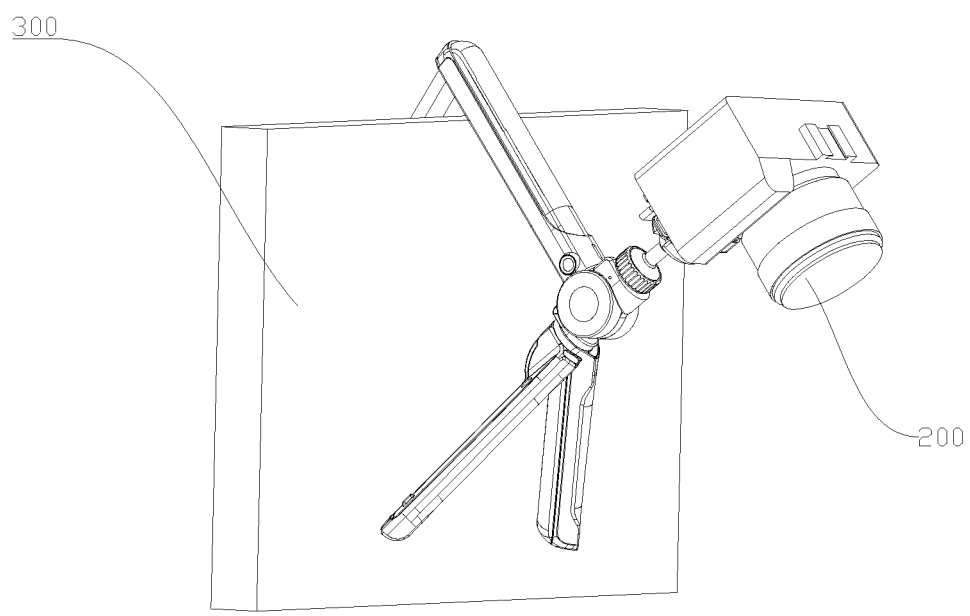
FIG. 18 is a structural schematic view showing that the image acquisition device is mounted on the support frame in embodiments of the present disclosure (hanging mode)

In an optional solution of this embodiment, the support frame further includes a stop member 106, and at least the primary leg 101 is provided with the stop member 106 for enabling the support frame to be mounted on a host object 300 (as shown in FIG. 18). Through the stop member 106, the support frame may be hung on the host object 300, in this way, on the one hand, the two hands may be freed, and on the other hand, different photographing requirements may be satisfied. The host object 300 may be a wall, a plate, a rack, or all structures that can facilitate hanging the support frame, and enable the support frame to be in a stable state, so that the situation that the image acquisition apparatus 200 shakes or the support frame falls from the host object 300 due to the instability of the support frame can be avoided.

It should be noted that at least one sub-leg of the first sub-leg 102 and the second sub-leg 103 may also be provided with the stop member 106, which facilitates enabling the support frame to be mounted on the host object 300.

In an optional solution of this embodiment, the support frame further includes a pan-tilt adjustment structure for adjusting a rotation angle of the first pan-tilt connector 104 relative to the primary leg 101. Through the pan-tilt adjustment structure, the rotation angle of the first pan-tilt connector 104 is advantageously realized, for example, a pitch angle is adjusted, so as to satisfy the requirements in photographing, for example, low-angle photographing, high-angle photographing or horizontal photographing. It should be noted that when a placement direction of the support frame is changed, the pitch angle may be changed into an azimuth angle, and may also be changed into another state, but the rotation angle of the first pan-tilt connector 104 is stilled changed.

In an optional solution of this embodiment, the pan-tilt adjustment structure includes a first button 107, a first crankset 108, a second crankset 109, and a first elastic member 110; the first crankset 108 is fixedly connected to the first pan-tilt connector 104, and the first elastic member 110 is configured to enable teeth on the second crankset 109 to mesh with teeth on the first crankset 108; the first button 107 is configured to overcome an elastic force of the first elastic member 110 under action of an external force, so that the teeth on the second crankset 109 are separated from the teeth on the first crankset 108.

The first crankset 108 may be of an integral structure with the first pan-tilt connector 104, thus it can ensure the safety and stability of an external device such as the image acquisition apparatus 200 on the first pan-tilt connector 104 in the using process. The first elastic member 110 may be a spring, and the teeth on the second crankset 109 can mesh with the teeth on the first crankset 108 by applying through the first elastic member 110 a force on the second crankset 109. There are a plurality of teeth on the first crankset 108 and on the second crankset 109 respectively, and the plurality of teeth may be distributed in a circular shape, that is, the plurality of teeth form a circular shape. In use, the user presses the first button 107, so that the first button 107 can move in a first direction against the elastic force of the first elastic member 110, so that the first elastic member 110 is compressed, and finally the teeth on the second crankset 109 and the teeth on the second crankset 108 no longer mesh with each other, and at this time, the rotation angle of the first pan-tilt connector 104 may be adjusted. When the external force is withdrawn, that is, when the user no longer applies a force onto the first button 107, the elastic potential energy of the first elastic member 110 which is not compressed is released, then the second crankset 109 is allowed to move in the direction in which the first crankset 108 is located, so that the teeth on the second crankset 109 mesh with the teeth on the first crankset 108, so as to lock the first pan-tilt connector 104, thus the first pan-tilt connector cannot rotate freely.

In an optional solution of this embodiment, the support frame further includes a first adapter 112 and a second adapter 113, wherein the first adapter 112 is connected to the secondary leg 201, and the second adapter 113 is fixedly connected to the primary leg 101. The first crankset 108 and the second crankset 109 are both located between the second adapter 113 and the first adapter 112, wherein the second crankset 109 is located between the first crankset 108 and the second adapter 113. After the first adapter 112 and the second adapter 113 are provided, the relative rotation between the primary leg 101 and the secondary leg is conveniently achieved.

In an optional solution of this embodiment, the first pan-tilt connector 104 is fixedly connected to the outer circumferential surface of the first crankset 108.

In an optional solution of this embodiment, the first button 107 includes a keycap 114 and a key handle 115, one end of the key handle 115 is connected to the keycap 114, the first adapter 112 has a insertion hole 116 for the key handle 115 to pass therethrough, and the other end of the key handle 115 abuts against a surface of the second crankset 109. The keycap 114 is conveniently pressed by a finger, and when the keycap 114 is pressed, the key handle 115 can enable the second crankset 109 to move, so that the teeth on the second crankset 109 are separated from the teeth on the first crankset 108.

The keycap 114 may be circular, polygonal or the like; the number of key handles 115 is two, a radial section of each key handle 115 is in a circular arc shape, and a radial direction of each key handle 115 is parallel to a radial direction of the keycap 114. The insertion hole 116 on the first adapter 112 may be in a circular arc shape, so as to fit with the key handles 115; the two key handles 115 are symmetrically provided at one side of the keycap 114. Optionally, the other end of each key handle 115 has a first protrusion 117, and the first protrusions 117 extend along the radial direction of the key handles 115 for limiting the key handles 115 on the first adapter 112; the key handles 115 have a certain elasticity, then when mounting the key handles 115 on the first adapter 112, the two key handles 115 are pinched, and the key handles 115 are enabled to pass through their respective insertion holes 116, and the first protrusions 117 are also enabled to pass through the first insertion holes 116, then after the passing, the two key handles 115 are released, and the key handles 115 restore an original state under the action of elasticity, so that the first protrusions 117 function to stop and prevent the key handles 115 from escaping from the first adapter 112. By providing the two key handles 115 and the two insertion holes 116, the movement of the first button 107 also may be guided, thus preventing the first button 107 from rotating around an axis parallel to the first direction.

In an optional solution of this embodiment, the teeth on the second crankset 109 are located on one surface of the second crankset 109, and the other opposite surface of the second crankset 109 is provided with a guide post 118; one surface of the second adapter 113 has a guide groove 119 cooperating with the guide post 118 for guiding the axial movement of the second crankset 109. The rotation of the second crankset 109 relative to the second adapter 113 can be prevented, i.e., circumferential fixation of the second crankset and the second adapter is achieved, by the guide post 118 and the guide groove 119.

The pan-tilt adjustment structure further includes a first nylon gasket 120, a second nylon gasket 121, a retaining screw 122, a screw sleeve 123, a locking screw 124 and a shaft sleeve 125; the first nylon gasket 120 and the second nylon gasket 121 are both in an annular shape; the first nylon gasket 120 is located between the first adapter 112 and the first crankset 108, i.e. two opposite surfaces of the first nylon gasket 120 are in contact with the first adapter 112 and the first crankset 108 respectively; the second adapter 113 has a shaft hole 126, the guide groove 119 is provided on a hole wall of the shaft hole 126, and a maximum outer diameter of the second crankset 109 is smaller than an inner diameter of the shaft hole 126, so that the second crankset 109 can move in the shaft hole 126. An inner ring diameter of the second nylon gasket 121 should be larger than the maximum outer diameter of the second crankset 109, and the second nylon gasket 121 is sandwiched between the first crankset 108 and the second adapter 113, that is, two opposite surfaces of the second nylon gasket 121 are in contact with the first crankset 108 and the second adapter 113 respectively; by providing the first nylon gasket 120 and the second nylon gasket 121, the first crankset 108 has a certain damping force when driving the first pan-tilt connector 104 to rotate. One end of the shaft sleeve 125 has a stop cap 127, and the other end of the shaft sleeve 125 passes, after being inserted from a mounting through hole on the second adapter 113, through a mounting through hole on the second crankset 109, and then is sleeved over a positioning shaft 128 provided on one surface of the first adapter 112. An inner wall of the hole of the shaft sleeve 125 has a rotation stop groove 129, and the positioning shaft 128 is provided with a rotation stop protrusion 130. The rotation stop protrusion 130 cooperates with the rotation stop groove 129, and after the shaft sleeve 125 is sleeved over the positioning shaft 128 on the first adapter 112, the relative rotation between the shaft sleeve 125 and the first adapter 112 is prevented by the rotation stop protrusion 130 and the rotation stop groove 129. An external thread of the screw sleeve 123 is threadedly connected to a threaded hole on the first adapter 112; the locking screw 124 is threadedly connected to an internal thread of the screw sleeve 123 after passing through a sleeve hole of the shaft sleeve 125, and the retaining screw 122 is threadedly connected to the threaded hole at the end of the locking screw 124. The stop cap 127 of the shaft sleeve 125 may be in contact with one side of the second adapter 113. The retaining screw 122 can prevent the locking screw 124 from escaping from the shaft sleeve 125; the first adapter 112 and the second adapter 113 are connected together by the locking screw 124, the shaft sleeve 125, the screw sleeve 123 and the retaining screw 122, and the second adapter 113 can rotate relative to the first adapter 112. The first direction is parallel to an axial direction of the shaft sleeve 125. One end of the first elastic member 110 abuts against a hole bottom of the shaft hole 126, and the other end of the first elastic member 110 abuts against one surface of the second crankset 109 having the guide post 118. It should be noted that the screw sleeve 123 may also be of an integral structure with the first adapter 112, that is, a threaded hole cooperating with the external screw of the locking screw 124 is provided on the first adapter; in addition, the method for preventing the locking screw 124 from escaping from the shaft sleeve 125 is not limited thereto, the retaining screw further may be replaced by other fasteners, and the fasteners may be a clamping spring (i.e. stop ring) or a pin which may be a split pin; when a clamping spring is adopted, an anti-disengagement slot may be provided in the circumferential direction of the end of the locking screw, and when the end of the locking screw provided with the anti-disengagement slot extends out of the screw sleeve 123, the clamping spring is clamped into the anti-disengagement slot, thereby the locking screw can be prevented from escaping; and when a pin is used, a radial perforation may be provided at the end of the locking screw, and after the end of the locking screw provided with the radial perforation extends out of the screw sleeve 123, the pin is inserted into the radial perforation, so that the locking screw can be prevented from escaping.

In an optional solution of this embodiment, the first adapter 112 may be an integral part of the leg adjustment structure; the first adapter 112 includes a first cylindrical ring 131 and an insertion shaft 132 fixedly connected to an outer circumferential surface of the first cylindrical ring 131; the insertion shaft 132 is inserted into a damping shaft 133, and the insertion shaft 132 is circumferentially fixed to the damping shaft 133; the outer circumferential surface of the first cylindrical ring 131 has a plurality of positioning grooves 134 distributed along its own circumferential direction, the primary leg 101 has a second button, and the second button can be limited in different positioning groove 134, so as to adjust the opening angle between the primary leg 101 and the secondary leg.

The first adapter 112 further may include a bottom rest 136 having an arc-shaped curved surface 135, wherein the arc-shaped curved surface 135 is located on an upper surface of the bottom rest 136, and the first cylindrical ring 131 is fixed on the upper surface of the bottom rest 136. The insertion shaft 132 is fixed to a lower surface of the bottom rest 136, that is, the insertion shaft 132 is fixedly connected to the first cylindrical ring 131 via the bottom rest 136. The arc-shaped curved surface 135 may be adapted to a circular outer circumferential surface of the first crankset 108 and a circular outer circumferential surface of the second adapter 113, and the first crankset 108 and the second adapter 113 are supported by the arc-shaped curved surface 135 to a certain extent.

In an optional solution of this embodiment, the number of positioning grooves 134 is at least three, the second button includes a first columnar portion 137 and a second columnar portion 138 connected to the first columnar portion 137, and an axis of the first columnar portion 137 is perpendicular to an axis of the second columnar portion 138; the first columnar portion 137 abuts against a return elastic member 139, and is configured in such a manner that when the first columnar portion 137 is pressed, the second columnar portion can escape from the positioning groove 134, so that the second adapter 113 can rotate relative to the first adapter 112.

The primary leg 101 has a key hole 140 and a side hole 141, and the side hole 141 is provided on a hole wall of the key hole 140; and an axial direction of the side hole 141 is perpendicular to an axial direction of the key hole 140. The first columnar portion 137 is inserted into the key hole 140, and the second columnar portion 138 is inserted into the side hole 141. Since the second columnar portion 138 is inserted into the side hole 141, and the second columnar portion 138 is connected to the first columnar portion 137, the first columnar portion 137 will not escape from the key hole 140. The return elastic member 139 may be a spring, and the return elastic member 139 is mounted in the key hole 140, and abuts against one end of the first columnar portion 137. The side hole 141 may be a waist-shaped hole or a stripe-shaped hole, so that when the first columnar portion 137 is pressed, the second columnar portion 138 may move radially along the waist-shaped hole or the stripe-shaped hole, thereby facilitating the end of the second columnar portion inserted into the positioning groove 134 to escape from the positioning groove 134. The first columnar portion 137 may be threadedly connected with the second columnar portion 138. When three positioning grooves 134 are provided, three angular changes may be achieved between the primary leg 101 and the secondary leg.

It should be noted that the number of positioning grooves 134 also may be two, four, five or more, so as to meet the requirements of different situations.

In an optional solution of this embodiment, the primary leg 101 is fixedly connected to the second adapter 113, and the primary leg and the second adapter may be of an integral structure. When being unlocked by the second button, the end of the second columnar portion escapes from the positioning groove 134, so that the second adapter 113 can rotate relative to the first adapter 112, so as to adjust the opening angle between the primary leg 101 and the secondary leg.

In an optional solution of this embodiment, the support frame further includes a shield 142, and a length extension direction of the shield 142 is in an arc shape so as to be adapted to the outer circumferential surface of the first cylindrical ring 131; and the shield 142 can cover the plurality of positioning grooves 134 to avoid entry of foreign matters. One end of the shield 142 has a protrusion 143, an end face of one end of the primary leg 101 has a recess 144, the protrusion 143 is inserted into the recess 144, a lower surface of the first pan-tilt connector 104 has an arc-shaped surface 145, and the shield 142 is limited between an outer circumferential surface of the first cylindrical ring 131 and an arc-shaped surface 145 of the lower surface of the first pan-tilt connector 104, so that the shield 142 can be prevented from escaping from the support frame. When the primary leg 101 rotates relative to the first adapter 112, the shield 142 will be driven to rotate around the outer circumferential surface of the first cylindrical ring 131.

In an optional solution of this embodiment, an angle adjustment structure 40 is provided between the first sub-leg 102 and the second sub-leg 103, so as to adjust an opening angle between the first sub-leg 102 and the second sub-leg 103. By means of the angle adjustment structure 40, the unfolding or folding between the first sub-leg 102 and the second sub-leg 103 can be realized, and after adjusting the opening angle, it is helpful to keep the required angle not to be changed easily. The angle adjustment structure 40 can realize that a fixed set angle is formed after the first sub-leg and the second sub-leg are unfolded.

Referring to FIG. 9, FIG. 11, FIG. 12, FIG. 13 and FIG. 21, in an optional solution of this embodiment, the damping shaft 133 may be an integral part of the angle adjustment structure 40, and an outer circumferential surface of the damping shaft 133 has a first limiting groove 146 extending along its own axis.

One end of the first sub-leg 102 and one end of the second sub-leg 103 each have a damping hole 147, and an inner wall of the damping hole 147 is provided with a first limiting rib 165 extending along its own axial direction; the damping shaft 133 passes through the damping hole 147 of the first sub-leg 102 and the damping hole 147 of the second sub-leg 103, and the first limiting rib is located in the first limiting groove 146. The groove bottom of the first limiting groove is provided with a positioning notch 166, and the positioning notch is close to a groove wall of the first limiting groove; optionally, the number of positioning notch may be two, and the two positioning notches are located at two opposite groove walls to the first limiting groove, respectively; when the first sub-leg and the second sub-leg are fully unfolded to form a set angle, the first limiting rib falls into the positioning notch, so that it is helpful to keep the set angle between the first sub-leg and the second sub-leg not to be changed easily. It should be noted that the material of the damping shaft may be plastic, rubber or silicone, so that the damping shaft can be deformed to a certain extent, so as to facilitate the stability of the angle between the two sub-legs after the first limiting rib falls into the positioning notch.

The damping shaft 133 may have a spline hole, and an outer surface of the insertion shaft 132 may have an outer spline, so that after the insertion shaft 132 is inserted into the spline hole of the damping shaft 133, the outer spline on the insertion shaft 132 cooperates with the inner spline in the spline hole, thus circumferential fixation between the damping shaft 133 and the insertion shaft 132 may be realized. One end of the first sub-leg 102 and one end of the second sub-leg 103 each have a disc-like structure 148, and the damping hole 147 is provided on the disc-like structure 148; and the disc-like structure 148 of the first sub-leg 102 is located between the disc-like structure 148 of the second sub-leg 103 and the bottom rest 136.

The axial direction of the insertion shaft 132 is perpendicular to the axial direction of the shaft sleeve 125, which is beneficial to realize that a rotational axis of the primary leg 101 relative to the secondary leg 201 is perpendicular to a rotational axis of the first sub-leg 102 relative to the second sub-leg 103, thereby being favorable for realizing three-leg support. When three legs are used for supporting, taking ground, as a position where the support frame is placed, as an example for illustration, when three legs are used for supporting, the rotational axis of the primary leg 101 relative to the secondary leg 201 may be parallel to the ground, while the rotational axis of the first sub-leg 102 relative to the second sub-leg 103 is perpendicular to the ground, in this way, when the angle between the primary leg 101 and the secondary leg 201 is fixed through locking by the leg adjustment structure, the force exerted on the support frame by the image acquisition apparatus 200 placed on the first pan-tilt connector 104 is a downward force, and as the rotational axis of the first sub-leg relative to the second sub-leg is perpendicular to the ground, the first sub-leg and the second sub-leg are less likely to rotate relative to each other, thus ensuring the stability and safety of the image acquisition apparatus 200 during use; in addition, the rotational axis of the primary leg 101 relative to the secondary leg 201 is perpendicular to the rotational axis of the first sub-leg relative to the second sub-leg, which is also advantageous to realize the extended handheld mode.

The angle adjustment structure 40 further may include a third nylon gasket 149, a fourth nylon gasket 150, a bottom cover 151 and a flat-head screw 152, and the third nylon gasket 149 is located between the disc-like structure 148 of the first sub-leg 102 and the bottom rest 136, so that there may be a certain damping force when the first sub-leg 102 rotates; the fourth nylon gasket 150 is located between the disc-like structure 148 of the second sub-leg 103 and the disc-like structure 148 of the first sub-leg 102, so that there may be a certain damping force when the first sub-leg 102 and the second sub-leg 103 rotate. The bottom cover 151 is fixedly connected to the insertion shaft 132 via the flat-head screw 152, the bottom cover 151 has a concave hole 153, and the concave hole 153 has an inner spline cooperating with the outer spline on the outer surface of the insertion shaft 132, in this way, the bottom cover 151 can be avoided from rotating along with the second sub-leg 103 to cause loosening of the flat-head screw 152. The bottom cover 151 may prevent the first sub-leg 102 and the second sub-leg 103 from escaping from the insertion shaft 132. A disc surface of the disc-like structure 148 of the first sub-leg 102 is provided at an angle with the length extension direction of the first sub-leg 102, the disc surface of the disc-like structure 148 of the second sub-leg 103 is provided at an angle with the length extension direction of the second sub-leg 103, in this way, after the primary leg 101 and the secondary leg are folded, it is beneficial to realize that when the primary leg 101 and the secondary leg are handheld, the image acquisition apparatus 200 on the first pan-tilt connector 104 can better capture/shoot the user or other scenes.

Figure 22:
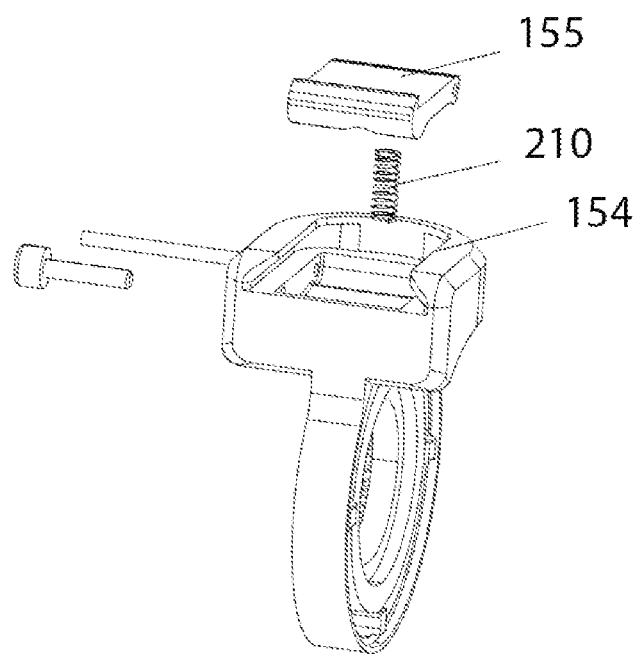
FIG. 22 is a structural schematic view of assembly relationship of a first insertion slot, a first stopper and a second elastic member of the first pan-tilt connector provided in embodiments of the present disclosure.
Figure 23:
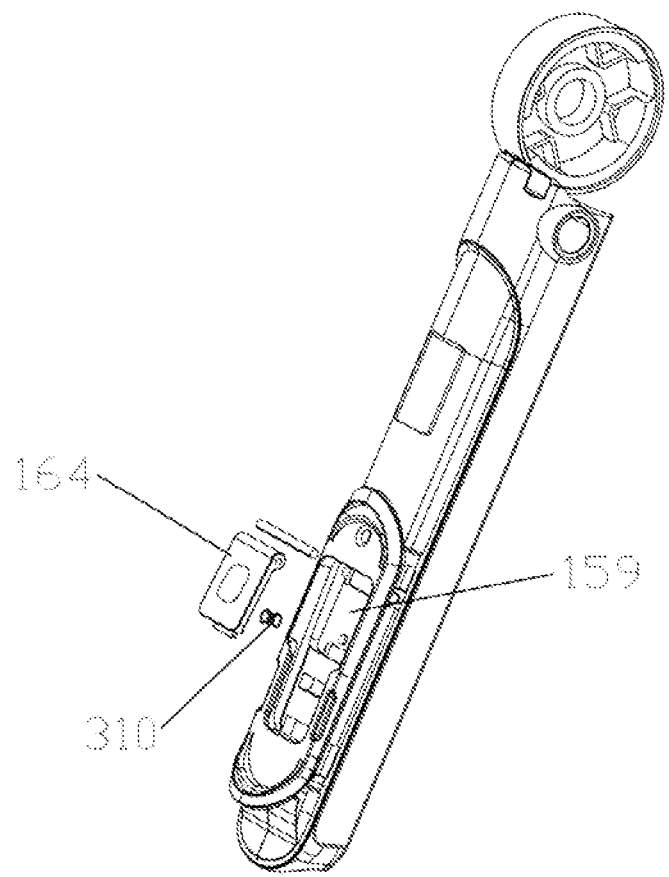
FIG. 23 is a structural schematic view of assembly relationship of a second insertion slot, a second stopper and a third elastic member of the second pan-tilt connector provided in embodiments of the present disclosure.

In an optional solution of this embodiment, as shown in FIG. 22, the first pan-tilt connector 104 is provided with a first insertion slot 154, an insertion opening of the first insertion slot 154 is provided with a first stopper 155, and the first stopper 155 is configured to be able to extend or retract under the elastic action of the second elastic member 210. The second elastic member 210 may realize the stability of the mounting of an external device mounted on the first pan-tilt connector 104, and avoid the external device from escaping from the first insertion slot 154. Likewise, the second pan-tilt connector 105 is provided with a second insertion slot 159, an insertion opening of the second insertion slot 159 is provided with a second stopper 164, and the second stopper 164 is configured to be able to extend or retract under the elastic action of the third elastic member 310. The third elastic member 310 may realize the stability of the mounting of an external device mounted on the second pan-tilt connector 105, and avoid the external device from escaping from the second insertion slot 159. The first insertion slot 154 and the second insertion slot 159 both may be dovetail slots or wedge-shaped slots capable of achieving the same function. Both the second elastic member 210 and the third elastic member 310 may be springs.

One end of the first stopper 155 is rotatably connected to the first pan-tilt connector 104 through the first pin shaft 156, the other end of the first stopper 155 may limit, through the second pin shaft 157, the second elastic member 210 between the first stopper 155 and the groove bottom of the first insertion slot 154, in this way, pressing the other end of the first stopper 155 can make the first stopper 155 move downward to achieve retraction, and when the first stopper 155 is released, the first stopper 155 may move upward, achieving the extension state, and positioning the external device mounted on the first pan-tilt connector 104. The hole where the second pin shaft 157 is located is a waist-shaped hole, that is, the cross section of the hole is in a waist shape, so that when the first stopper 155 is pressed down, the second pin shaft 157 may move along a radial direction of the waist-shaped hole.

One end of the second stopper 164 is rotatably connected to the second pan-tilt connector 105 through the third pin shaft, the other end of the second stopper 164 may limit by a stop portion the second elastic member 210 between the second stopper 164 and the groove bottom of the second insertion slot 159, in this way, pressing the other end of the second stopper 164 can make the second stopper 164 move downward to achieve retraction, and when the second stopper 164 is released, the second stopper 164 may move upward, achieving the extension state, and positioning the external device mounted on the second pan-tilt connector 105. A leg cover 160 may be installed at the second insertion slot 159, so that when the second pan-tilt connector 105 is not used, the leg cover 160 may be detachably connected to the second insertion slot 159 in a buckling way.

In an optional solution of this embodiment, the stop member 106 is provided at the other opposite end of the primary leg 101, and the stop member 106 can rotate relative to the primary leg 101 for cooperating with the primary leg 101 to form a hook structure.

The stop member 106 is rotatably mounted at one end of the primary leg 101 by a fifth pin shaft 162; the primary leg 101 has a countersink 163, and the stop member 106 can rotate to be received in the countersink 163, and also can rotate to get out of the countersink 163, so as to cooperate with the primary leg 101 to form a hook structure. The stop member 106 may be of a plate-like structure, and when the stop member 106 rotates out of the countersink 163, the stop member 106 can be stopped by a wall of the countersink 163, in this way, a first angle formed by the length direction of the stop member 106 and the length direction of the primary leg 101 is less than or equal to 90 degrees, and optionally, the first angle may be 60 degrees-70 degrees. One end of the plate-like structure is hinged with the primary leg 101, and a plate surface of the other end of the plate-like structure has a positioning block; when the stop member 106 is received in the countersink 163, the positioning block faces a bottom of the countersink 163. An end surface of a free end of the plate-like structure has a pulling structure, so that the plate-like structure can be pulled out of the countersink 163 with a hand. The pulling structure may be a groove structure or a handle. The first sub-leg 102 and the second sub-leg 103 can be folded, and the primary leg 101 and the secondary leg 201 can be folded, in this way, the primary leg 101, the first sub-leg 102 and the second sub-leg 103 are folded together to form one whole leg. In use, the photographing may be realized by holding the whole leg with hand. It should be noted that when the plate surface at the other end of the plate-like structure has a positioning block or other components capable of forming a hook structure with the plate-like structure, the first angle formed between the length direction of the stop member 106 and the length direction of the primary leg 101 may be greater than 90 degrees.

The support frame provided in this embodiment integrates the pan-tilt adjustment structure, the angle adjustment structure and the leg adjustment structure together, so that the three may work independently, and also may work cooperatively so as to meet different use requirements, enabling that the support frame has a handheld mode, a high-position three-leg support mode, a low-position three-leg support mode, an extended handheld mode and a hanging mode, etc.

I. Handheld Mode (See FIG. 14)

By adjusting the angle adjustment structure and the leg adjustment structure, the primary leg 101, the first sub-leg and the second sub-leg are folded together, and the image acquisition apparatus 200 may be mounted on the first pan-tilt connector 104, then the user may hold the whole leg with hand; and in order to satisfy the pitch demand of the image acquisition apparatus 200, the pitch angle may be adjusted by the pan-tilt adjustment structure 20.

II. High-Position Three-Leg Support Mode (See FIG. 15)

After long-time handheld mode or in order to realize three-leg support, the opening angle between the primary leg 101 and the secondary leg may be adjusted by adjusting the leg adjustment structure, then the high-position three-leg support mode may be realized by adjusting the opening angle between the first sub-leg 102 and the second sub-leg 103 through the angle adjustment structure.

III. Low-Position Three-Leg Support Mode (See FIG. 16)

When a lower-height position is needed for photographing, the opening angle between the primary leg 101 and the secondary leg may be increased by adjusting the leg adjustment structure, meanwhile, the opening angle between the first sub-leg 102 and the second sub-leg 103 may be increased by adjusting the angle adjustment structure. The low-position three-leg support mode has stronger stability, and also facilitates obtaining a low-position close-up perspective.

IV. Hanging Mode (See FIG. 17 and FIG. 18)

When three legs are used for supporting, the stop member 106 may be rotated out of the countersink 163, and the hook structure may be hung on the host object 300 such as a plate-mounted object, thereby realizing a stable supporting structure formed by two sub-legs and one hook structure, then the image acquisition apparatus 200 may be mounted and fixed, the use in multiple environments and scenes such as indoor or outdoor environment is satisfied, and shooting in a small space may be realized.

V. Extended Handheld Mode (See FIG. 19)

The image acquisition apparatus 200 is mounted on the second pan-tilt connector 105, and then the opening angle between the primary leg 101 and the secondary leg 201 is adjusted by the leg adjustment structure, and the photographing is realized by holding the secondary leg with hand; the opening angle between the primary leg 101 and the secondary leg 201 may be 140 degrees, which sufficiently takes into consideration the photographing perspective and the holding comfort of the human body, and complies with ergonomics. Through the extended handheld mode, a more open scene can be quickly obtained for framing, and the self-timer experience is greatly optimized.

An embodiment of the present disclosure further provides a photographing device, which includes the image acquisition apparatus 200 and the above support frame; and the image acquisition apparatus 200 is mounted on the support frame. The image acquisition apparatus 200 may be an apparatus capable of obtaining an image or video, such as a camera, a video camera, a mobile phone or a webcam. When the image acquisition apparatus 200 is mounted on the support frame, the photographing device may have a handheld photographing mode, a high-position three-leg support photographing mode, a low-position three-leg support photographing mode, an extended handheld photographing mode, a hanging photographing mode and so on.

In summary, the support frame and the photographing device provided in the embodiments of the present disclosure may be made of soft and hard rubber and metallic materials, so that they have high structural reliability, with stable photographing, relatively strong stability during use, and a plurality of use modes, and can realize handheld, high-position, low-position, extended and hanging modes and so on, wherein different modes can be quickly switched, to meet the photographing requirements of creating multiple scenes and multiple angles, with good user experience, and applicability to different application scenes; in addition, the three legs may be conveniently unfolded or folded, occupying a relative small space, then they are convenient to be carried, and easy to be disassembled and installed. The design of an ergonomic handheld angle makes the hand-holding more labor-saving; the first stopper 155 and the second stopper 164 respectively provided for the first pan-tilt connector 104 and the second pan-tilt connector 105 facilitate disassembly of the image acquisition apparatus 200, facilitate rapid changing positions of the image acquisition apparatus 200 on the support frame, enabling that the camera has a wide field of view for use.

Finally, it should be explained that the various embodiments above are merely used for illustrating the technical solutions of the present disclosure, rather than limiting the present disclosure; although the detailed description is made to the present disclosure with reference to various preceding embodiments, those ordinarily skilled in the art should understand that they still could modify the technical solutions recited in various preceding examples, or make equivalent substitutions to some or all of the technical features therein; and these modifications or substitutions do not make the corresponding technical solutions essentially depart from the scope of the technical solutions of various embodiments of the present disclosure. In the description provided herein, numerous specific details are described. It will be appreciated, however, that the embodiments of the present disclosure may be practiced without these specific details. In some embodiments, well-known methods, structures and techniques are not shown in detail so as not to obscure the understanding of the present description. Besides, a person skilled in the art could understand that although some embodiments described herein include certain features included in other embodiments rather than other features, combinations of features in different embodiments mean that they fall within the scope of the present disclosure and form different embodiments.

INDUSTRIAL APPLICABILITY

The present disclosure provides a support frame and a photographing device, wherein a plurality of use modes of the support frame may be flexibly realized by adjusting the angle adjustment structure, the leg adjustment structure and the pan-tilt adjustment structure, i.e. the handheld mode, the high-position three-leg support mode, the low-position three-leg support mode, the hanging mode and the extended handheld mode, and a plurality of use states of the photographing apparatus, so as to solve the technical problem existing in the prior art that the user will uncomfortable with hand or arm if holding the apparatus for a long time.

What is claimed is:

1. A support frame, comprising a first pan-tilt connector and a leg assembly connected to the first pan-tilt connector, wherein the leg assembly comprises a primary leg and a secondary leg; a leg adjustment structure is provided between the primary leg and the secondary leg, the leg adjustment structure is configured to unlock or lock the primary leg and the secondary leg, so that the primary leg and the secondary leg are capable of moving relative to each other or keeping relatively stationary; the secondary leg comprises a first sub-leg and a second sub-leg, and the first sub-leg and the second sub-leg are configured in such a manner that the first sub-leg and the second sub-leg are capable of being unfolded or folded with respect to each other, wherein when the first sub-leg and the second sub-leg are unfolded with respect to each other, the primary leg, the first sub-leg and the second sub-leg are in a three-leg support state; and wherein the support frame further comprises a pan-tilt adjustment structure configured to adjust a rotation angle of the first pan-tilt connector relative to the primary leg, wherein the pan-tilt adjustment structure comprises a first button, a first crankset, a second crankset, and a first elastic member, wherein the first crankset is fixedly connected to the first pan-tilt connector, and the first elastic member is configured to enable teeth on the second crankset to mesh with teeth on the first crankset; and the first button is configured to overcome an elastic force of the first elastic member under action of an external force, so that the teeth on the second crankset are separated from the teeth on the first crankset, wherein the leg adjustment structure comprises a first adapter, the first adapter comprises a first cylindrical ring, an outer circumferential surface of the first cylindrical ring has a plurality of positioning grooves distributed along a circumferential direction of the first cylindrical ring, the primary leg has a second button, and the second button is capable of being limited in a different positioning groove, so as to adjust the opening angle between the primary leg and the secondary leg, wherein the primary leg is fixedly connected to a second adapter, the second adapter is connected to the first adapter, and the second adapter is capable of rotating relative to the first adapter; and the first crankset and the second crankset are both located between the second adapter and the first adapter, wherein the second crankset is located between the first crankset and the second adapter.

2. The support frame according to claim 1, wherein one end of the primary leg, one end of the first sub-leg and one end of the second sub-leg are connected to each other so as to form an end connection portion; and
the first pan-tilt connector is provided at the end connection portion.

3. The support frame according to claim 1, further comprising a second pan-tilt connector, wherein the second pan-tilt connector is provided on the primary leg.

4. The support frame according to claim 3, wherein the second pan-tilt connector is provided with a second insertion slot, an insertion opening of the second insertion slot is provided with a second stopper, and the second stopper is configured to be extendable or retractable under an elastic action of a third elastic member.

5. The support frame according to claim 1, further comprising a stop member, wherein at least the primary leg is provided with the stop member configured to enable the support frame to be mounted on a host object.

6. The support frame according to claim 5, wherein the stop member is provided at one end of the primary leg, that is not connected to one end of the first sub-leg and one end of the second sub-leg, and the stop member is capable of rotating relative to the primary leg for cooperating with the primary leg to form a hook structure.

7. The support frame according to claim 1, wherein an angle adjustment structure is provided between the first sub-leg and the second sub-leg, and configured to adjust an opening angle between the first sub-leg and the second sub-leg.

8. The support frame according to claim 7, wherein the angle adjustment structure comprises a damping shaft configured to pass through a damping hole of the first sub-leg and a damping hole of the second sub-leg, wherein each of inner walls of the damping hole of the first sub-leg and the damping hole of the second sub-leg is provided with a first limiting rib extending along an axial direction of the each inner wall, and the first limiting rib is configured to be limited in the first limiting groove which is located at an outer circumferential surface of the damping shaft and extends along an axis of the damping shaft.

9. The support frame according to claim 1, wherein one surface of the second crankset having no teeth is provided with a guide post, and one surface of the second adapter is provided with a guide groove configured for cooperating with the guide post.

10. The support frame according to claim 9, wherein the second adapter has a shaft hole, and the guide groove is provided on a hole wall of the shaft hole.

11. The support frame according to claim 10, wherein one end of the first elastic member abuts against a hole bottom of the shaft hole, and the other end of the first elastic member abuts against the surface of the second crankset having the guide post.

12. The support frame according to claim 1, wherein the pan-tilt adjustment structure further comprises a first nylon gasket, a second nylon gasket, a retaining screw, a screw sleeve, a locking screw and a shaft sleeve, wherein the first nylon gasket is located between the first adapter and the first crankset, the second nylon gasket is sandwiched between the first crankset and the second adapter, a stop cap of the shaft sleeve is in contact with one side of the second adapter, the locking screw is threadedly connected to an internal thread of the screw sleeve after passing through a sleeve hole of the shaft sleeve, and the retaining screw is threadedly connected to a threaded hole at an end of the locking screw.

13. The support frame according to claim 12, wherein the angle adjustment structure further comprises a third nylon gasket, a fourth nylon gasket, a bottom cover and a flat-head screw, wherein the third nylon gasket is located between a disc-like structure of the first sub-leg and a bottom rest, the fourth nylon gasket is located between a disc-like structure of the second sub-leg and the disc-like structure of the first sub-leg, the bottom cover is fixedly connected to an insertion shaft of the first adapter via the flat-head screw, the bottom cover has a concave hole, and the concave hole is provided therein with an inner spline configured for cooperating with an outer spline on an outer surface of the insertion shaft.

14. The support frame according to claim 1, wherein the first pan-tilt connector is fixedly connected to an outer circumferential surface of the first crankset.

15. The support frame according to claim 1, wherein the first pan-tilt connector is provided with a first insertion slot, an insertion opening of the first insertion slot is provided with a first stopper, and the first stopper is configured to be extendable or retractable under an elastic action of a second elastic member.

16. A photographing device, comprising an image acquisition apparatus and the support frame according to claim 1, wherein the image acquisition apparatus is mounted on the support frame.

* * * * *